US012633668B2

(12) United States Patent
Panther et al.

(10) Patent No.: US 12,633,668 B2
(45) Date of Patent: May 19, 2026

(54) GNSS ANTENNA SYSTEMS, ELEMENTS AND METHODS

(71) Applicant: CALIAN GNSS LTD., Kanata (CA)

(72) Inventors: Gyles Panther, Dunrobin (CA); Julien Hautcoeur, Gatineau (CA); Reza Movahedinia, Stittsville (CA); James Stuart Wight, Ottawa (CA)

(73) Assignee: Tallysman Wireless Inc., Kanata (CA)

( * ) Notice: Subject to any disclaimer, the term of this patent is extended or adjusted under 35 U.S.C. 154(b) by 138 days.

(21) Appl. No.: 18/737,439

(22) Filed: Jun. 7, 2024

(65) Prior Publication Data

US 2024/0332808 A1      Oct. 3, 2024

Related U.S. Application Data

(63) Continuation of application No. 17/753,800, filed as application No. PCT/CA2020/051188 on Aug. 31, 2020, now Pat. No. 12,046,841.

(60) Provisional application No. 62/900,605, filed on Sep. 15, 2019.

(51) Int. Cl.
| | |
|---|---|
| *H01Q 9/28* | (2006.01) |
| *G01S 19/36* | (2010.01) |
| *H01Q 21/20* | (2006.01) |
| *H01Q 21/26* | (2006.01) |
| *H01Q 25/00* | (2006.01) |

(52) U.S. Cl.
CPC ............ *H01Q 9/285* (2013.01); *G01S 19/36* (2013.01); *H01Q 21/205* (2013.01); *H01Q 21/26* (2013.01); *H01Q 25/001* (2013.01)

(58) Field of Classification Search
CPC .......... H01Q 5/25; H01Q 9/285; H01Q 19/36; H01Q 21/20; H01Q 21/205; H01Q 21/26; H01Q 25/001
See application file for complete search history.

(56) References Cited

U.S. PATENT DOCUMENTS

| | | | |
|---|---|---|---|
| 9,024,834 B1 | 5/2015 | Elsallal et al. | |
| 2008/0191955 A1 | 8/2008 | Manholm et al. | |
| 2011/0279339 A1 | 11/2011 | Johnston | |
| 2012/0075155 A1* | 3/2012 | Lindmark ............ | H01Q 19/106 343/834 |
| 2018/0323513 A1 | 11/2018 | Varnoosfaderani et al. | |
| 2019/0140364 A1 | 5/2019 | Mirmozafari et al. | |

(Continued)

*Primary Examiner* — Daniel Munoz
(74) *Attorney, Agent, or Firm* — Rosenberg, Klein & Lee

(57) ABSTRACT

The design of a Global Navigation Satellite System (GNSS) antenna requires consideration of a range of characteristics including, for example, the ability for tracking satellites at low elevation, phase centre variation (PCV), antenna efficiency and impedance, axial ratio and up-down ratio (UDR), antenna bandwidth, etc. whilst also providing a light weight, compact and robust form factor. For rover applications this becomes particularly important when the satellites being accessed may be at low elevations where prior art GNSS antenna exhibit poor performance. To address this a GNSS antenna is provided comprising a domed array of opposed metallized antenna elements which are indirectly coupled via a pair of dipoles to the feed network thereby avoiding the difficulties associated with direct electrical connections of feed circuits to antenna elements.

16 Claims, 16 Drawing Sheets

(56)  References Cited

U.S. PATENT DOCUMENTS

| 2022/0376407 A1* | 11/2022 | Liu | .......................... | H01Q 5/42 |
| 2023/0395995 A1* | 12/2023 | Sissoev | .................... | H01Q 1/42 |

* cited by examiner

100A

110

110

170A

120

130

140

130

150

180

170B

100B

110

110

110

110

110

120

160

170A

300B

220

230

210C

210D

210B

240

210A

400B

410A

410B

440

220

430A 430B

420A

230

420B 430C 430D

500

410A        220        410B 530A  430A        510  550  430B  530B        440

420A  520        230  420B

600

540A    430C    560        430D    540B        440

800

910

110

900

110

1000A

110

130
1010
110

130
1010

110

1000B

110

110

110

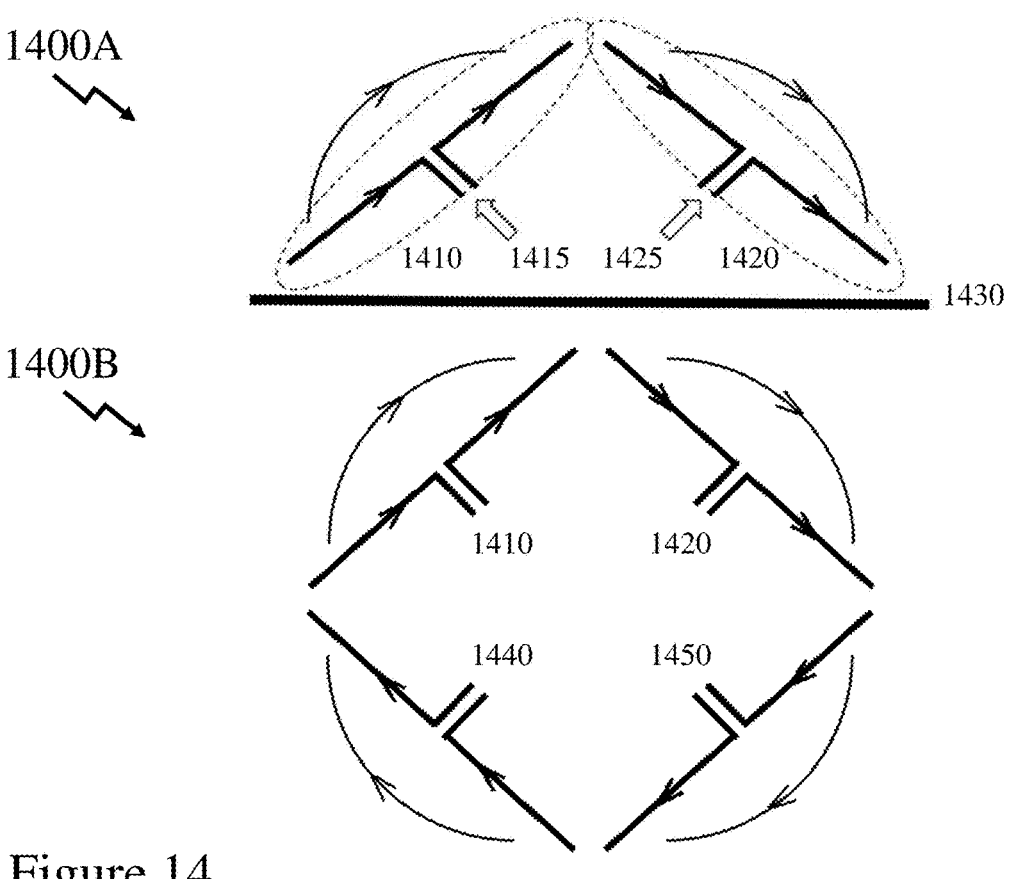
1400A
1410  1415  1425  1420
1430
1400B
1410     1420
1440     1450
Figure 14
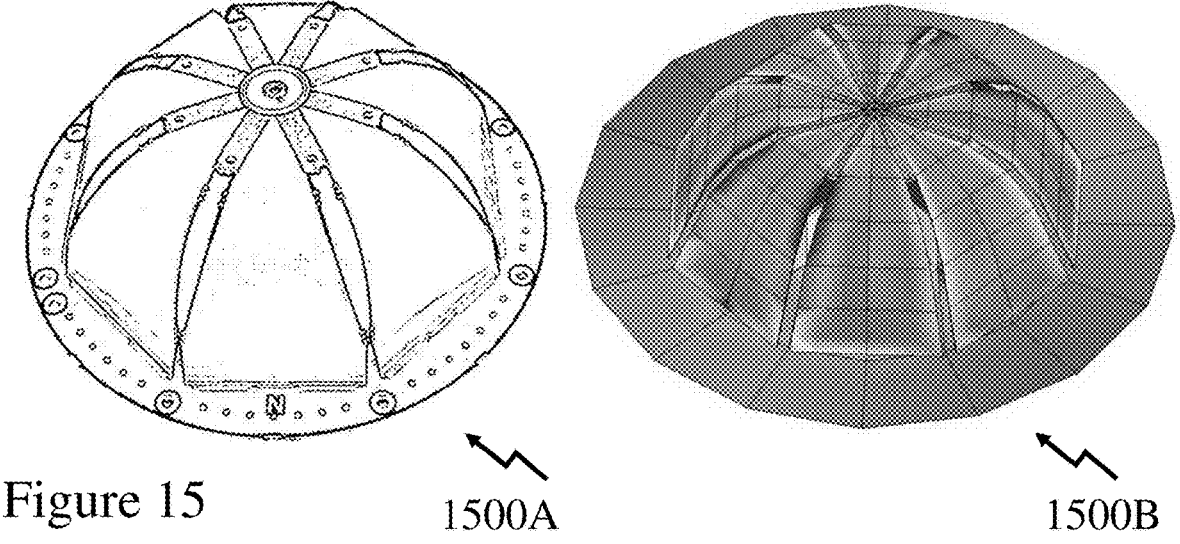
Figure 15     1500A     1500B 1600A  1600B 1600C  1600D

1800

1900

2000

2100

2200

2300

2400

GNSS ANTENNA SYSTEMS, ELEMENTS AND METHODS

CROSS-REFERENCE TO RELATED APPLICATIONS

This patent application claims the benefit of priority as a continuation of U.S. patent Ser. No. 17/753,800 filed Mar. 15, 2022; which itself claims the benefit of priority as a 371 National Phase Entry Application of PCT/CA2020/051188 filed Aug. 31, 2020; which itself claims the benefit of priority from U.S. Provisional Patent Application 62/900, 605 filed Sep. 15, 2019; the entire contents of each being incorporated herein by reference.

FIELD OF THE INVENTION

This patent application relates to global navigation satellite systems and more particularly to antennas, antenna elements and antenna assemblies employing one or more pairs of antenna elements each electromagnetically coupled to a dipole with enhanced azimuthal performance and/or wide bandwidth high precision high purity reception.

BACKGROUND OF THE INVENTION

Global satellite navigation systems or global navigation satellite systems (GNSS) employ a network of geo-spatially positioned satellites to broadcast precisely synchronized navigation messages, thereby providing for determination of a network time and a geolocation by dedicated GNSS receivers. Such receivers provide for a ubiquitous and global time reference, in addition to a host of geolocation uses, ranging from consumer navigation devices to means to monitor global warming to precision agriculture and of course, military applications.

Modern Global Navigation Satellite Systems (GNSS) receivers are commonly designed and configured to receive signals from multiple constellations, such as the European Galileo, Russian GLONASS, US GPS, and Chinese Beidou Global Navigation Systems, plus at least two regional positioning and timing systems such as the Indian NAVIC and Japanese QZSS systems. The most widely used usage of GNSS receivers is in consumer products such as vehicle navigation system, personal navigation systems etc. where a typical accuracy to within 2 meters (4 m in diameter) 95% of the time when stationary is achieved but electronic processing and filtering within the associated software processing the received GNSS signals either smooths statistical variations or snaps a location icon to a "most likely" feature on a map such that consumer level tracking usually appears to be more accurate than it is in fact.

However, within other applications the reported positions should be true (i.e. accurate) and reliable, often with the true position being reported within a higher degree of precision. Such applications can include surveying, automated vehicle control and/or guidance systems, precision agriculture, unmanned aerial vehicle (UAV) guidance, and real time navigation for aircraft etc. Such high precision GNSS receivers can provide true locations to within 10 cm, or with corrections data, within 2-3 cm, or to within 1-2 mm for stationary systems with lengthy integration periods.

Such precision GNSS receivers receive signals on two or more frequencies and employ complex models for the troposphere and ionosphere in order to estimate signal times of flight from the multiple satellites employed in establishing an accurate position in three dimensions. Additionally, such systems exploit data transmitted by the satellites within the navigation signals relating to errors in the position and time estimates of a satellite which can arise from factors such as the orbital conditions encountered by the satellite.

In concept this is all relatively straight-forward. However, the peak RF power flux density (PFD) of GNSS signals on the surface of the earth is approximately −120 dBm and decreases as the satellite(s) get close to the horizon. Accordingly, if there are sufficient satellites accessible the GNSS receiver may selectively employ the signals from satellites at high altitude with higher PFD. However, it would be beneficial for the GNSS receiver to have the ability to track signals down to the horizon. The ability to achieve this is entirely dependent upon the quality of the signals delivered by the GNSS antenna to the GNSS receiver. In addition to clear reception of extremely low level RF signals, it is also important that the phases for each of the received signals be independent of the angles of incidence on the antenna. Further, GNSS receivers must support reception of circularly polarized signals.

This arises as there is no means to improve or restore any real time aspect of a received GNSS signal, such as polarization purity, phase integrity or signal quality (signal to noise), or phase centre. The only usable information available to a GNSS receiver is the signal presented at the terminals of the GNSS antenna, so that precision of a GNSS receiver system rests in the first instance entirely on the antenna.

Accordingly, it would be beneficial to provide GNSS receiver designers with a GNSS antenna elements and GNSS antenna systems that are not subject to one or more limitations of the prior art solutions.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to global navigation satellite systems and more particularly to antennas, antenna elements and antenna assemblies employing one or more pairs of antenna elements each electromagnetically coupled to a dipole with enhanced azimuthal performance and/or wide bandwidth high precision high purity reception.

In accordance with an embodiment of the invention there is provided a method of providing an antenna comprising:

providing a narrow band dipole coupled electromagnetically to a symmetrical arrangement of metallized petals which are arranged centrally over a distal metallized ground plane and with symmetrical antipodal feed signals connected to the dipole feed connections at the center of the dipole; wherein the antenna provides a wideband return loss and impedance at the dipole feed connections; and the metallized petals provide a wideband low loss matching feed network to increase the radiative efficiency of the combined structure.

In accordance with an embodiment of the invention there is provided a method of providing an antenna comprising:

providing a dipole coupled electromagnetically to a symmetrical arrangement of metallized petals, arranged centrally over a distal metallized ground plane, with symmetrical antipodal feed signals connected to the dipole feed connections at the center of the dipole which are further connected to feed connections confined toward the center of the ground plane; wherein the dipole and symmetrical arrangement of metallized petals are disposed above a ground plane;

local current maxima in the metallized petals are offset from the dipole center; and the ground plane remains essentially devoid of dipole feed return currents.

In accordance with an embodiment of the invention there is provided a method of providing an antenna comprising:

providing a narrow band dipole coupled electromagnetically to a symmetrical arrangement of metallized petals, arranged centrally over a distal metallized ground plane, with symmetrical antipodal feed signals connected to the dipole feed connections at the center of the dipole; wherein local current maxima in the antenna metallized petals are offset from the dipole center; and an inflexion in the magnitude of a current in the combined radiating elements comprising the narrow band dipole and symmetrical arrangement of metallized petals occurs at the center of the dipole.

In accordance with an embodiment of the invention there is provided a method of providing an antenna comprising:

providing a narrow band dipole coupled electromagnetically to a symmetrical arrangement of metallized petals, arranged centrally over a distal metallized ground plane, with symmetrical antipodal feed signals connected to the dipole feed connections at the center of the dipole, wherein the symmetrical arrangement of metallized petals extends the bandwidth of the antenna structure to larger than that of the narrow band dipole alone.

In accordance with an embodiment of the invention there is provided an antenna comprising:

a ground plane substrate having a defined center and comprising a first metallization layer which forms a ground plane for the antenna;

an opposed pair of petals metallized on a petal substrate wherein each petal of said opposed pair of petals is electrically isolated, and geometrically identical and comprises a first wider end and a second distal narrower end co-linearly disposed along a first petal axis wherein, the width of the metallized petal progressively decreases from the first wider end to the second distal narrower end, the proximate ends of the opposed pair of petals are the distal second ends, with a petal substrate center at the midpoint between said metallized petals;

a dipole substrate is disposed between the ground plane and said petal substrate; orthogonal to the ground plane with a second metallization layer patterned to provide a dipole in the plane of the dipole substrate comprising a pair of identical dipole elements, of a predetermined geometry, disposed co-linearly on a first dipole axis, parallel with the ground plane substrate and connected at their proximate ends to a first dipole feed point, and a second dipole feed point, respectively; wherein the first petal axis and the first dipole axis are linearly aligned with respective centers concentric with the ground plane center;

said petal substrate center is offset at a predetermined distance above the ground plane;

said petal substrate is curved symmetrically about the petal substrate center to form said metallized petals into an identical three-dimensional shape;

a spacing between a lower surface of each metallized petal of the opposed pair of petals and the nearest edge of the proximate dipole element has a predetermined profile radially from the center of the ground plane; and said dipole is effective through electromagnetic coupling to comprise a wideband distributed feed network, without direct electrical connection to said opposed petal pair.

In accordance with an embodiment of the invention there is provided an antenna comprising:

a ground plane substrate comprising a first metallization layer forming a ground plane for the antenna;

an opposed pair of metallized petals which are co-linearly disposed, each petal of the pair of metallized petals being identical and comprising a first wider end and a second distal narrower end with a central axis longer than the width of petal wherein the width progressively decreases from the first wider end to the second distal narrower end, the proximate ends of the opposed pair of metallized petals are the second distal narrower ends, and the midpoint between the opposed pair of metallized petals on their common linear axis defines a geometric center for the antenna; and a dipole substrate comprising a second metallization layer which is patterned to provide a narrow band dipole comprising a pair of dipole elements and a pair of interconnection tracks connecting each element of the dipole to a predetermined metallized terminal of a pair of metallized terminals; wherein a first axis of the narrow band dipole is aligned with the geometric centre for the antenna and perpendicular to the ground plane;

a second axis of the narrow band dipole is parallel to the ground plane and aligned with the opposed pair of metallized petals;

the first wider end of each petal has a predetermined spacing from the first metallization layer; and the opposed pair of metallized petals have a three-dimensional geometry such that a spacing between an inner surface of each metallized petal and a nearest edge of its associated dipole element varies in a predetermined manner with elevation from its first wider end to its second distal narrower end.

In accordance with an embodiment of the invention there is provided an antenna comprising:

a ground plane substrate with at least two metal layers, with the upper metal layer continuously metallized to comprise a ground plane surface, and with a central mounting slot and plurality of peripheral mounting slots, a dipole substrate, with a balun and a narrow band dipole imprinted in metal layers on the dipole substrate, said balun connected to metallized terminals on projecting tabs at the center of the lower edge of said dipole substrate, a three-dimensional structure comprised of said dipole substrate mounted on said ground plane substrate with said projecting tab inserted into said central mounting slot, in a plane orthogonal to the ground plane, said balun connected to an electric feed circuit on a lower metal layer of said ground plane substrate, an opposed pair of metallized petals etched in metal with a non-conductive margin on a semi-flexible dielectric substrate comprised of a first petal and a distal second petal, each of identical dimensions, each petal with a wider end and a distal narrower end, with a central axis longer than the wider end, progressively decreasing width between said wider end and said narrow end, each of first and second petals co-linear, with the proximate ends of said first and second petals being the narrower ends, with the midpoint between first and second petals on the extended common axis defined as the geometric antenna center, each of said petals having a plurality of metallized attachment tabs at the wider end, electrically isolated from said metallized petals, said semi-flexible substrate of sufficient length to form an arched structure by insertion of said attachment tabs into peripheral mounting slots in said ground plane; and the upper edge of said dipole substrate is sculpted to provide a precise space between the opposed petal pairs and said narrowband dipole whereby said dipole is effective through electromagnetic coupling to comprise a wideband distributed feed network, without direct electrical connection to said opposed petal pair.

In accordance with an embodiment of the invention there is provided an antenna comprising:

a ground plane substrate comprising a first metallization layer forming a ground plane for the antenna;

a first opposed pair of metallized petals which are co-linearly disposed, each petal of the first pair of metallized petals being identical and comprising a first wider end and a second distal narrower end with a central axis longer than the width of petal wherein the width progressively decreases from the first wider end to the second distal narrower end, the proximate ends of the first opposed pair of metallized petals are the second distal narrower ends, and the midpoint between the opposed pair of metallized petals on their common linear axis defines a geometric center for the antenna;

a second opposed pair of metallized petals which are co-linearly disposed, each petal of the second pair of metallized petals being identical and comprising a first wider end and a second distal narrower end with a central axis longer than the width of petal wherein the width progressively decreases from the first wider end to the second distal narrower end, the proximate ends of the opposed pair of metallized petals are the second distal narrower ends, and the midpoint between the second opposed pair of metallized petals is aligned with the geometric center for the antenna;

a first dipole substrate comprising a second metallization layer which is patterned to provide a first narrow band dipole comprising a pair of dipole elements and a pair of interconnection tracks connecting each element of the first narrow band dipole to a predetermined metallized terminal of a pair of metallized terminals; and a second dipole substrate comprising a third metallization layer which is patterned to provide a second narrow band dipole comprising another pair of dipole elements and another pair of interconnection tracks connecting each element of the second narrow band dipole to a predetermined metallized terminal of a pair of metallized terminals; wherein the first narrow band dipole is aligned with the geometric centre for the antenna and perpendicular to the ground plane;

the second narrow band dipole is aligned with the geometric centre for the antenna, perpendicular to the ground plane and perpendicular to the first narrow band dipole;

the central axis of each petal of the first opposed pair of metallized petals is aligned with the first narrow band dipole;

the central axis of each petal of the second opposed pair of metallized petals is aligned with the second narrow band dipole;

the first wider end of each petal has a predetermined spacing from the ground plane;

the first opposed pair of metallized petals have a three-dimensional geometry such that a spacing between an inner surface of each metallized petal and a nearest edge of its associated dipole element of the first dipole varies in a predetermined manner with elevation from its first wider end to its second distal narrower end; and the second opposed pair of metallized petals have a three-dimensional geometry such that a spacing between an inner surface of each metallized petal and a nearest edge of its associated dipole element of the second dipole varies in a predetermined manner with elevation from its first wider end to its second distal narrower end.

In accordance with an embodiment of the invention there is provided an antenna comprising:

a ground plane substrate with at least two metal layers, with the upper metal layer continuously metallised to comprise a ground plane surface, and with a first central mounting slot and a second central mounting slot disposed co-centric with and orthogonal to said first central mounting slot, and a plurality of peripheral mounting slots, a first and a second dipole substrate of equal outer dimensions, equally patterned with a balun and a narrowband dipole imprinted in metal layers on the dipole substrate, said balun connected to metallized terminals on projecting tabs at the center of the lower edge of said dipole substrates, said first and second dipoles including interlocking slots to provide for assembly of a three dimensional crossed dipole structure, an assembly comprised of an orthogonal dipole structure mounted on said ground plane substrate by insertion of the respective ones of the projecting tabs, into said first and second central mounting slots with first and second balun feeds connected a first and a second output of feed circuit comprised of an RF 90 degree coupler a first and a second opposed petal pair each comprised of a first petal and a distal second petal etched in metal with a non-conductive margin, on a semi-flexible substrate each of identical dimensions, each petal with a wider end and a distal narrower end, with a central axis longer than the wider end, with progressively decreasing width between said wider end and said narrower end, said first and second petals co-linear, with the proximate ends of said first and second petals being the narrower ends, said first and second opposed petal pairs disposed with the axis of each orthogonal to the other, with the common mid-point between first and second petals on each extended axis defined as the geometric antenna center.

each of said metallized petals having a plurality of metallized attachment tabs at the wider end, electrically isolated from said metallized petals, said semi-flexible substrate of sufficient length to form a domed structure by insertion of said attachment tabs into said peripheral mounting slots in said ground plane with said petal pairs aligned along the axes of the crossed dipoles, the upper edge of said first and second dipole substrates is sculpted identically to provide a precise space between the opposed petal pairs and said crossed narrowband dipoles whereby said dipoles are effective through electromagnetic coupling to comprise a wideband distributed feed network for a circularly polarized antenna, wherein none of said opposed petal pairs is directly connected.

In accordance with an embodiment of the invention there is provided an antenna comprising:

a ground plane substrate with at least two metal layers, with the upper metal layer continuously metallised to comprise a ground plane surface, and with a first central mounting slot and a second central mounting slot disposed co-centric with and orthogonal to said first central mounting slot, and a plurality of peripheral mounting slots, a first and a second dipole substrate of equal outer dimensions, equally patterned with a balun and a narrowband dipole imprinted in metal layers on the dipole substrate, said balun connected to metallized terminals on projecting tabs at the center of the lower edge of said dipole substrates, said first and second dipoles including interlocking slots to provide for assembly of a 3 dimensional crossed dipole structure, an assembly comprised of an orthogonal dipole structure mounted on said ground plane substrate by insertion of the respective ones of said projecting tabs into said first and second central mounting slots, and four interstitial support substrates mounted orthogonal to the ground plane, each rotated 45 degrees relative to an arbitrary one of said crossed dipole axes, so as to be similarly disposed in each quadrant of said crossed dipole structure, each interstitial support substrate having an upper profile identical to said crossed dipoles, with first and second balun feeds connected a first and a second output of feed circuit comprised of an RF 90 degree coupler a first, a second, a third and a fourth opposed petal pairs each comprised of a first petal and a distal second petal etched in metal with a non-conductive margin, on a semi-flexible substrate each of identical dimensions, each petal with a wider end and a distal narrower end, with a central axis longer than the wider end, with progressively decreasing width between said wider end and said narrower end, said first and second petals co-linear, with the proximate ends of said first and second petals being the narrower ends, the axis of an arbitrary second petal pair is rotated by 45 degrees relative to the axis of said first petal pair, with equal rotation between said third and said second petal pairs and said fourth and said third petal pairs, each with a common mid-point between first and second petals on each extended axis of each petal pair defined as the geometric antenna center, each of said metallized petals having a plurality of metallized attachment tabs at the wider end, electrically isolated from said metallized petals, said semi-flexible substrate of sufficient length to form a domed structure by insertion of said attachment tabs into said peripheral mounting slots in said ground plane with at least one of said petal pairs aligned along the axes of the one of said crossed dipoles, the upper edge of said first and second dipole substrates sculpted identically to provide a precise space between the opposed petal pairs associated with each of said crossed narrowband dipoles, the upper edges of said interstitial support substrates further sculpted identically to said dipole substrates whereby said dipoles are effective through electromagnetic coupling to comprise a wideband distributed feed network for a circularly polarized antenna, wherein none of said opposed petal pairs is directly connected.

In accordance with an embodiment of the invention there is provided a method of receiving circularly polarized radio frequency signals comprising:

providing a first pair of opposed metallized petals disposed above a ground plane and having a predetermined three dimensional profile relative to the ground plane;

providing a second pair of opposed metallized petals disposed above the ground plane and orthogonal to the first pair of opposed metallized petals and having the same predetermined three dimensional profile as the first pair of opposed metallized petals;

a first dipole comprising a pair of first dipole elements aligned with the first pair of opposed metallized petals such that;

a second dipole comprising a pair of second dipole elements aligned with the second pair of opposed metallized petals; wherein a distance from an upper edge of each first dipole element to its respective petal of the first pair of opposed metallized petals has a predetermined profile as a function of elevation from the ground plane; and a distance from an upper edge of each second dipole element to its respective petal of the second pair of opposed metallized petals has the predetermined profile as a function of elevation from the ground plane.

In accordance with an embodiment of the invention there is provided a method of receiving circularly polarized radio frequency signals comprising:

providing a first narrow band dipole electrically connected to a feed network;

providing a second narrow dipole orthogonal to the first dipole and electrically connected to the feed network;

providing a first pair of opposed metallized petals disposed above a ground plane and having a predetermined three dimensional profile relative to the ground plane;

providing a second pair of opposed metallized petals orthogonal to the first pair of opposed metallized petals, disposed above the ground plane and orthogonal to the first pair of opposed metallized petals and having the same predetermined three dimensional profile as the first pair of opposed metallized petals; wherein the first dipole and first pair of opposed metallized petals are aligned axially to one another;

the second dipole and second pair of opposed metallized petals are aligned axially to one another;

the first pair of opposed metallized petals provide broadband antenna elements which are radiatively coupled to the feed network via the first narrow band dipole; and the second pair of opposed metallized petals provide broadband antenna elements which are radiatively coupled to the feed network via the second narrow band dipole respectively.

According to an embodiment of the invention there is provided an antenna comprising:

a ground plane substrate with at least two metal layers, with the upper metal layer continuously metallized to comprise a ground plane surface, and with a central mounting slots and plurality of peripheral mounting slots, a first opposed pair of petals etched in metal on a semi-flexible substrate wherein each petal of said opposed pair of petals is electrically isolated, geometrically identical and comprises a first wider end and a second distal narrower end co-linearly disposed along a first petal axis parallel to the ground plane, the proximate ends of the opposed pair of petals are the distal second ends, with a petal substrate center defined as the midpoint between said metallized petals; and a second opposed pair of petals etched in metal on the semi-flexible substrate with a configuration identical to said first opposed pair of petals, disposed along a second petal axis parallel to the ground plane and orthogonal to said first petal axis, disposed concentrically with said first pair of petals a plurality of metallized attachment tabs disposed sequentially distal from the center of each petal substrate and further than the wider end of each metallized petal connected to an abutting metallized region where each metallized attachment tab of the plurality of attachment pads is electrically isolated from the metallization of its associated petal of the first opposed pair of petals or second opposed pair of petals;

a first dipole substrate disposed between the ground plane and said petal substrate orthogonal to the ground plane with a second metallization layer patterned to provide a first dipole in the plane of the dipole substrate comprising a first pair of identical dipole elements connected at their proximate ends to provide a first balanced dipole feed; and a second dipole substrate with a configuration identical to said first dipole substrate orthogonal to the ground plane disposed along a second dipole axis orthogonal to said first dipole axis comprising a second pair of identical dipole elements connected at their proximate ends to provide a second balanced dipole feed; wherein said semi-flexible substrate of sufficient length to form an arched structure by insertion of said metallized attachment tabs into peripheral mounting slots in said ground plane;

each metallized regions connected to ground via said metallized attachment tabs;

an upper edge of the first dipole substrate is sculpted to provide a predetermined spacing between the inner surface of each petal of one of the first opposed pair of petals or the second opposed pair of petals and the first pair of identical dipole elements;

an upper edge of the second dipole substrate is sculpted to provide a predetermined spacing between the inner surface of each petal of the other of the first opposed pair of petals or the second opposed pair of petals and the second pair of identical dipole elements;

whereby first dipole and the second dipole via electromagnetic coupling comprise a wideband distributed feed network on two orthogonal axes without direct electrical connections between any of the first dipole, the second dipole, the first opposed pair of petals and the second opposed pair of petals.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 14 depicts schematics of a dipole and a dipole with ground plane as implemented within embodiments of the invention;

FIG. 15 depicts a photograph of a GNSS antenna according to an embodiment of the invention and its simulated current distribution;

DETAILED DESCRIPTION

Figures 1A, 1B:
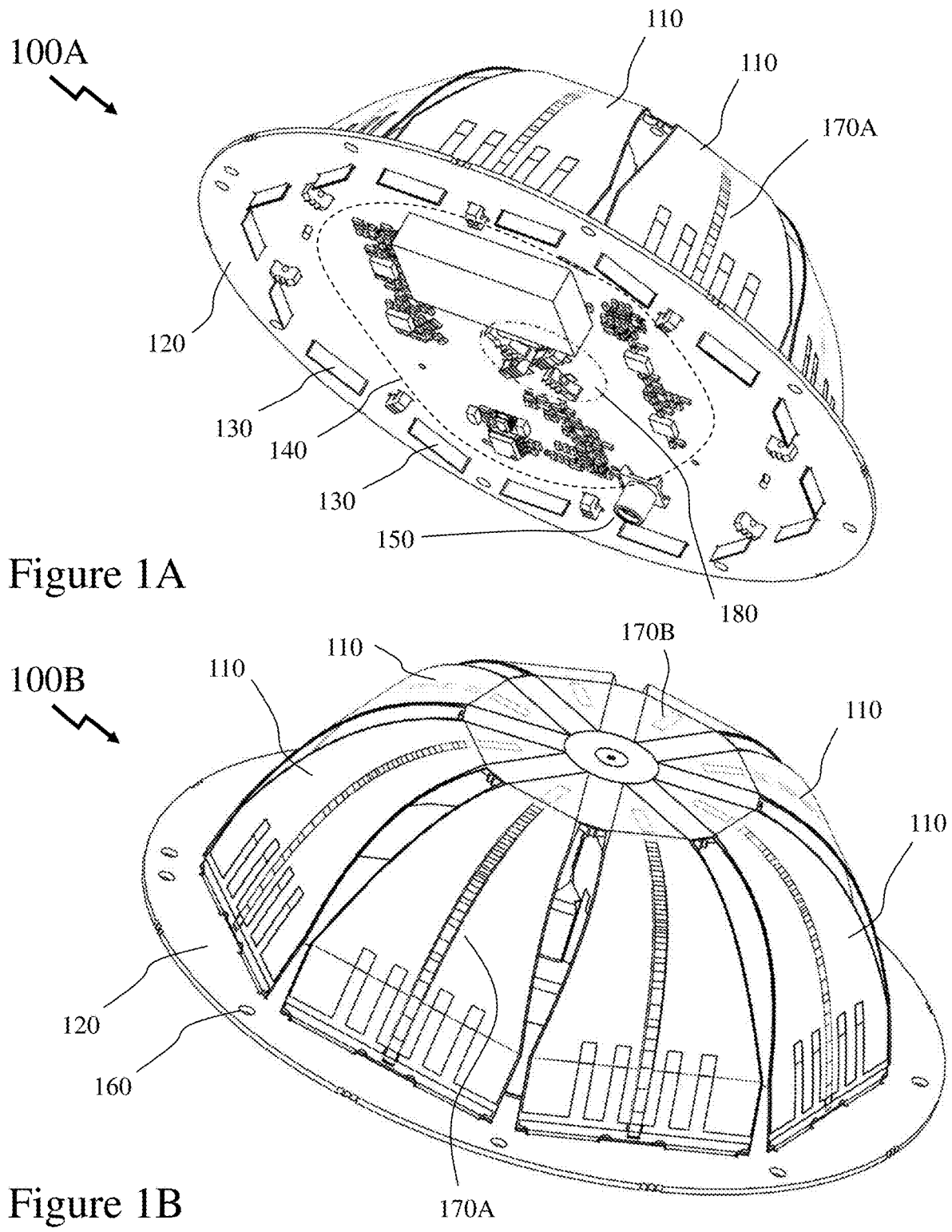
FIGS. 1A and 1B depict lower and upper perspective views of a GNSS antenna according to an embodiment of the invention.

The present invention is directed to global navigation satellite systems and more particularly to antennas, antenna elements and antenna assemblies employing one or more pairs of antenna elements each electromagnetically coupled to a dipole with enhanced azimuthal performance and/or wide bandwidth high precision high purity reception.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps, or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

Reference to terms such as "perpendicular", "along", "parallel" and grammatical variants thereof in respect to alignment and/or direction should be considered not as absolute but as having a tolerance to variation thereof such that these directions and/or alignments are "substantially" as indicated. Tolerances to these being as established, for example, through manufacturing tolerances, performance tolerances, manufacturing costs etc.

"Azimuth angle" as used herein refers to a rotation angle in the X-Y plane centered on the origin, and relative to a defined direction.

"Elevation angle" or "altitude" as used herein refers to the angle subtended between the Poynting vector of the incident plane wave, and the X-Y (ground) plane. Accordingly, a wave of grazing incidence from the horizon has a near zero elevation angle whilst a wave incident vertically has a 90 degree elevation angle.

"Axial ratio" as used herein refers to a measure of the extent to which an antenna is able to reject circularly polarized signals of the unwanted polarization (a second rotational sense) relative to the wanted polarization (a first rotational sense), and is a measure of the ability to reject multipath signals which is an important parameter for precision antennas.

"Phase center offset" as used herein refers to a concept that there is a region associated with an antenna which tends to a point for a perfect antenna, from within which or at, all signals may be considered to have been received at or transmitted from. This is a virtual region/point in space typically centered just above the midpoint of the physical antenna and is a measure of the limits of knowledge of an antenna's position in space.

"Phase center variation" as used herein refers to a measure of the apparent phase center movement over all incident angles for plane waves (i.e. around all azimuths and all elevation angles) and over all frequencies in the bandwidth. An ideal antenna having a phase center variation of zero.

A "petal" as used herein refers to a metallized antenna structure either free-standing, supported by a frame, patterned onto a substrate, or patented onto a substrate or carrier supported by a frame which provides a receiving antenna element for a GNSS antenna. For simplicity within the following mechanical description of GNSS antennae according to embodiments of the invention the term petal refers to the metallized antenna structure and any substrate or carrier together with ancillary elements for mechanical attachment/retention of the petal discretely or in an array of petals with one or more other elements of the GNSS antenna. Within the following functional description of GNSS antennae according to embodiments of the invention the term petal refers to the metallized antenna structure.

A "dipole antenna" (commonly referred to as a dipole) as used herein refers to, but is not limited to, any one of a class of antennas producing a radiation pattern approximating that of an elementary electric dipole with a radiating structure supporting a line current so energized that the current has only one node at each end.

A "radome" as used herein refers to, but is not limited to, an environmental housing or cover within which an antenna, e.g. a GNSS antenna, is housed which is transparent to wireless signals in the frequencies of interest.

A GNSS "rover" antenna as used herein refers to, but is not limited to, a GNSS antenna addressing real-time kinematic (RTK) and mobile (roving) applications.

A "CubeSat" as used herein refers to, but is not limited to, a U-class spacecraft which is a form of miniaturized satellite which is made up of multiples of 10 cm×10 cm×10 cm cubic units (4"×4"×4"). A CubeSat may employ commercial off-the-shelf (COTS) components for their electronics and structure.

As discussed above GNSS receivers are employed within a wide range of applications within both the civil and military markets. One such dominant configuration for dual band receivers for civilian applications is the use of the L1+L2 bands of the GPS system (formerly Navstar GPS). The operating frequency bands for GPS L1 and GPS L2 being listed below in Table 1 together with the frequency bands of the other major GNSS systems introduced in the 2000s, namely Beidou, Galileo, GLONASS, GPS, and NAVIC.

14

Section 1: Design Principles

The design of a GNSS antenna requires consideration of a range of characteristics including, for example, the ability for tracking satellites at low elevation, phase centre variation (PCV), antenna efficiency and impedance, axial ratio and up-down ratio (UDR), antenna bandwidth, etc. whilst also providing a light weight, compact and robust form factor. Whilst the following description and embodiments of the invention are directed towards a GNSS rover antenna it would be evident to one of skill in the art that the designs and principles outlined may be employed in the design and implementation of GNSS antennas for other applications and scenarios without departing from the scope of the invention.

1A: Low Elevation Tracking: The use of Precise Point Positioning (PPP) and satellite broadcast of the PPP corrections data has become widely adopted. PPP correction data is broadcast from geostationary satellites, which generally subtend low elevation angles to many densely populated regions such as Europe and much of North America. The link margin of L band signals is typically low (or thin), so that improved gain at these elevation angles is an important attribute for a GNSS antenna. This issue is exacerbated at satellite beam edges and northern latitudes, where the link margin is further challenged and a difference of just 1 dB in antenna gain or antenna noise figure can make a significant difference in correction availability. A key design parameter in this respect is the antenna gain-to-noise temperature (G/T) which is the ratio of the antenna element gain divided by the receiver system noise temperature, typically determined by the antenna noise figure. For example, the inventors have targeted a G/T objective for GNSS antenna according to embodiments of the invention of −25.5 dB/K at a 10° elevation angle.

The gain of most prior art GNSS antenna elements, such as patches and crossed dipoles, rolls off rapidly as the

TABLE 1

| Operating Frequencies of GNSS Systems (Nearest 1 MHz) | | | |
| --- | --- | --- | --- |
| System Owner | Beidou China | Galileo Europe | GLONASS Russia |
| Freq. | 1.559-1.563 GHz (B1) 1.195-1.210 GHz (B2) 1.256-1.280 GHz (B3) | 1.164-1.189 GHz (E5a) 1.189-1.214 GHz (E5b) 1.260-1.300 GHz (E6) 1.559-1.591 GHz (E1) | 1.593-1.610 GHz (G1) 1.237-1.254 GHz (G2) 1.189-1.214 GHz (G3) |
| System Owner | GPS USA | NAVIC India | |
| Freq. | 1.563-1.587 GHz (L1 signal) 1.215-1.2396 GHz (L2 signal) 1.164-1.189 GHz (L5 Band) | 1.164-1.188 GHz (L5 Band) 2.483-2.500 GHz (S Band) | |

There is also increasing deployment of satellites which also provide a navigation signal on the L5 band and accordingly GNSS receivers compatible with the L1+L5 signals discretely or L1+L2+L5 signals. L5 offers several benefits including, but not limited to, twice as L2, being within a band designated by the International Telecommunication Union (ITU) for the Aeronautical Radio-Navigation Services (ARNS) which is less prone to interference with ground based navigation aids, and sharing the same frequency space as the E5A signal from Galileo. Similarly, there is benefit in having GNSS receivers compatible with the GPS and Galileo systems, for example, allowing a device comprising such a receiver to be employed in regions where one or both GNSS systems are accessible.

elevation angles decreases towards the horizon. The polarization response of these prior art GNSS antenna elements also becomes linear at the lower elevation angles, due to the existence of a ground plane, necessary to increase gain in the hemisphere above the antenna. Improved gain close to the horizon also increases the ability of the receiver to track low elevation satellites with a concomitant improvement in the dilution of precision parameter (DOP), which is a metric related to pseudorange measurement accuracy. Most commercially available GNSS rover antennae for a peak gain at zenith of about 3.5 dBic to 5 dBic with a roll-off at the horizon of 10-12 dB. Typically, this provides an antenna gain at horizon, at best, of about −5 dBic, which is insufficient for optimized L band correction usage. Within the prior art different antenna types such as helical elements have been proposed to overcome this issue, but their cylindrical shape and longer length makes them unsuitable for many applications, particularly roving (or rover) applications. Furthermore, the helix suffers from back lobes that can make the antenna more susceptible to reception of multipath signals incident below the positive hemisphere of the antenna.

Accordingly, as evident in Sections 2 and 3 the inventors have established a GNSS rover antenna exploiting wide bandwidth radiating elements (hereinafter referred to as "petals") which surround a distributed feed network in order to achieve superior Right Hand Circular Polarized (RHCP) gain at low elevation angles in a high performance GNSS antenna with small form factor yet with an assembly providing increased ease of manufacture and improved reproducibility.

1B: Phase Centre Variation (PCV): The phase centre of an ideal antenna is a notional point in space at which all signals are received or transmitted from, independent of the frequency, or elevation or azimuth angle of signal incidence. However, the phase centres of real life antennas are less tidy, and the PCV is a measure of the variation of the "zero" phase point as a function of frequency, elevation, and azimuth angles. Correction data for phase center variation is commonly encoded in a standardized file, e.g. an Antenna Exchange Format (ANTEX) file, which can be applied concurrently for precision applications. The azimuthal orientation of rover antennas is typically unknown so that errors for specific azimuth angles cannot be accounted for. The PCV corrections data provided in the ANTEX file are usually provided as a function of elevation and frequency, but with averaged azimuth data for each elevation and frequency (designated "noazi" corrections). Thus, corrections can be applied for each frequency and elevation angle but errors due to the variation in the azimuthal PCV cannot be corrected in the receiver. For RTK systems, the net system error is the RMS sum of the base and rover antenna phase center variations. It is usually possible to accommodate larger base station antennas, which can commonly provide PCVs approaching +/−1 mm (e.g. from Tallysman® VeraPhase™ or VeraChoke™ antennas). However, in many instances the accuracy of the combined system is largely determined by the PCV of the smaller GNSS rover antenna. Thus, even with corrections data, azimuthal symmetry in the GNSS antenna is key. Accordingly, the design approach employed by the inventors focused on symmetry for both the antenna element structure and mechanical housing design.

1C: Antenna Efficiency and Impedance: Antenna Efficiency (AE) can be narrowly defined in terms of copper losses of the radiating elements but feed network losses also contribute and accordingly, a design objective should be the optimization of both. It is generally known by those of skill in the art that physically wide radiating elements are a key requirement for wider bandwidth and that copper presents a good compromise for the radiator metal. Within the design as described below in Section 2 wide physical petals are employed although it would be evident that in narrow band applications alternate petal designs with narrower geometries may be employed without departing from the scope of the invention. Similarly, the experimental results described in Section 3 exploit copper as the petal metallization although it would be evident that other materials may be employed including, for example, silver offers improved conductivity but is expensive.

However, as will be evident from Section 2 the GNSS antenna according to embodiments of the invention the petals are parasitic resonators that are tightly coupled to a distributed feed network, which in itself is intrinsically narrowband. Accordingly, the resulting wide bandwidth response of the GNSS antenna according to embodiments of the invention results from the load on the feed network provided by the excellent wideband radiation resistance of the petals.

This arrangement was chosen because the resulting impedance at the de-embedded antenna feed terminals is close to the ideal impedance required (50 Ohms), thus requiring minimal impedance matching. The near ideal match over a wide bandwidth is important because it allows the impedance to be transformed to ideal using a very short transmission line, typically less than lambda/4, that can include an embedded infinite balun.

Within the embodiments of the invention described and depicted in respect of FIGS. 1A to 10B below in Section 2 petals are employed in conjunction with a dipole for each orthogonal exciter axis wherein the pair of orthogonal exciter axes are electrically independent and highly isolated electrically (better than −30 dB within fabricated GNSS antenna according to embodiments of the invention), even with the parasitic petal coupling. To achieve a desired circular polarization, the two axis are then driven independently, in phase quadrature as derived from hybrid couplers, for example, within the associated microwave/RF circuit associated with the GNSS antenna which may be implemented upon a PCB forming part of the GNSS antenna or an external circuit. As will be evident from the results presented in Section 4 the resulting GNSS antenna according to embodiments of the invention combining inherently efficient parasitic petals combined with a low loss distributed feed network result in a highly efficient GNSS antenna structure offering superior performance to prior art solutions.

1D: Axial Ratio (AR) and Up-Down Ratio (UDR): AR characterizes the performance of the antenna's ability to receive circular signals whilst the UDR is the ratio of gain pattern amplitude at a positive elevation angle ($\alpha$) to the maximum gain pattern amplitude at its mirror image ($-\alpha$). Good AR and UDR across the full bandwidth of the antenna is required to ensure the purity of the reception of the RHCP signals within GNSS systems and to mitigate multipath effects. GNSS signals reflected from the ground, buildings, or metallic structures such as vehicles are delayed and the purity of their RHCP signals is degraded with Left Hand Circular Polarized (LHCP) signals. As GNSS antenna according to embodiments of the invention were designed to provide improved gain at low elevation angles, a very low AR and a high UDR are particularly important to mitigate multipath interference.

1E: Wide Antenna Bandwidth: A wide GNSS bandwidth antenna allows the system employing it to achieve positioning based on GNSS signals from multiple constellations, e.g. satellites from multiple GNSS systems. Recent research has shown that interoperability between different satellite constellations can significantly improve navigation and positioning performance. In particular, it has been shown that a wide bandwidth GNSS antenna allows for the implementation of three-carrier and multicarrier ambiguity resolution techniques to obtain the highest possible precision. In challenging environments where some signals may be blocked from time to time by foliage, buildings, etc. then these blocked signals may be replaced by signals from satellites in other constellations that are not subject to such blockage. Accordingly, it would be beneficial for a GNSS antenna to be capable of reception over the full GNSS frequency bandwidth from 1.15 GHz to 1.60 GHz.

1F: Lightweight, Robust and Compact: There is continuous pressure for smaller GNSS antennas, but precision rover GNSS antennas are typically required to receive signals in both the low and high GNSS frequency bands. There is an unescapable constraint that limits the bandwidth of small antennas, so that in order to provide a full bandwidth rover GNSS antennas, unavoidably, tend to be larger. Accordingly, being ever mindful of performance additional mechanical objectives were established by the inventors for embodiments of the invention although it would be evident that such mechanical constraints may be different within other systems and hence GNSS antenna with different configurations may be employed but still exploiting the design concepts and methodologies outlined within this specification and remain within the scope of the invention.

According, the GNSS antenna according to an embodiment of the invention whose results are presented in Section 4 were for a small and light weight radiating element (given the full bandwidth requirement) with a ground plane size of approximately 100 mm (4 inches), an element height of 30 mm or lower (1.2" or lower), and a weight of 100 grams or less (3.5 ounces or less). It would be evident that smaller versions of this GNSS antenna may be implemented exploiting embodiments of the invention albeit with different performance. Applications for GNSS antennas according to embodiments of the invention may include, but not be limited to, housed antennas (such as RTK rovers) and also a lightweight antennae suitable for mobile applications like such as drones, UAVs, CubeSats, etc.

Within the following description with respect to embodiments of the invention as described and depicted with respect to FIGS. 1 to 24 then the inventors have established an antenna design methodology to achieve the performance objections outlined in Section 1, these being antenna elements and systems which employ dipole feed(s). The following description is split into Section 2 to 5 respectively wherein:

Section 2 relates to the mechanical design of dipole fed antenna elements and systems according to embodiments of the invention;

Section 3 relates to the operating principles of dipole fed antenna elements and systems according to embodiments of the invention;

Section 4 relates to the performance of dipole fed antenna elements and systems according to embodiments of the invention; and Section 5 relates to comparison of dipole fed antenna elements and systems according to embodiments of the invention to the prior art.

Section 2: Mechanical Design of Dipole Fed Antenna Elements and Systems

Within the following description with respect to FIGS. 1 to 15 embodiments of the invention with respect to GNSS antenna structures are described. As discussed above in Section 1 there are several performance aspects of GNSS antennas where it is desirable to concurrently optimize performance. The underlying design principles of GNSS antennas according to embodiments of the invention are described below in Section 4 with respect to FIGS. 14-15 whilst the performance of prototype GNSS antennas exemplary embodiments of the invention are presented below in Section 3 with respect to FIGS. 16-22. The design principle established by the inventors therefore comprises of radiating petals which are electromagnetically (i.e. radiatively) coupled to a dipole.

Figures 13A, 13B:
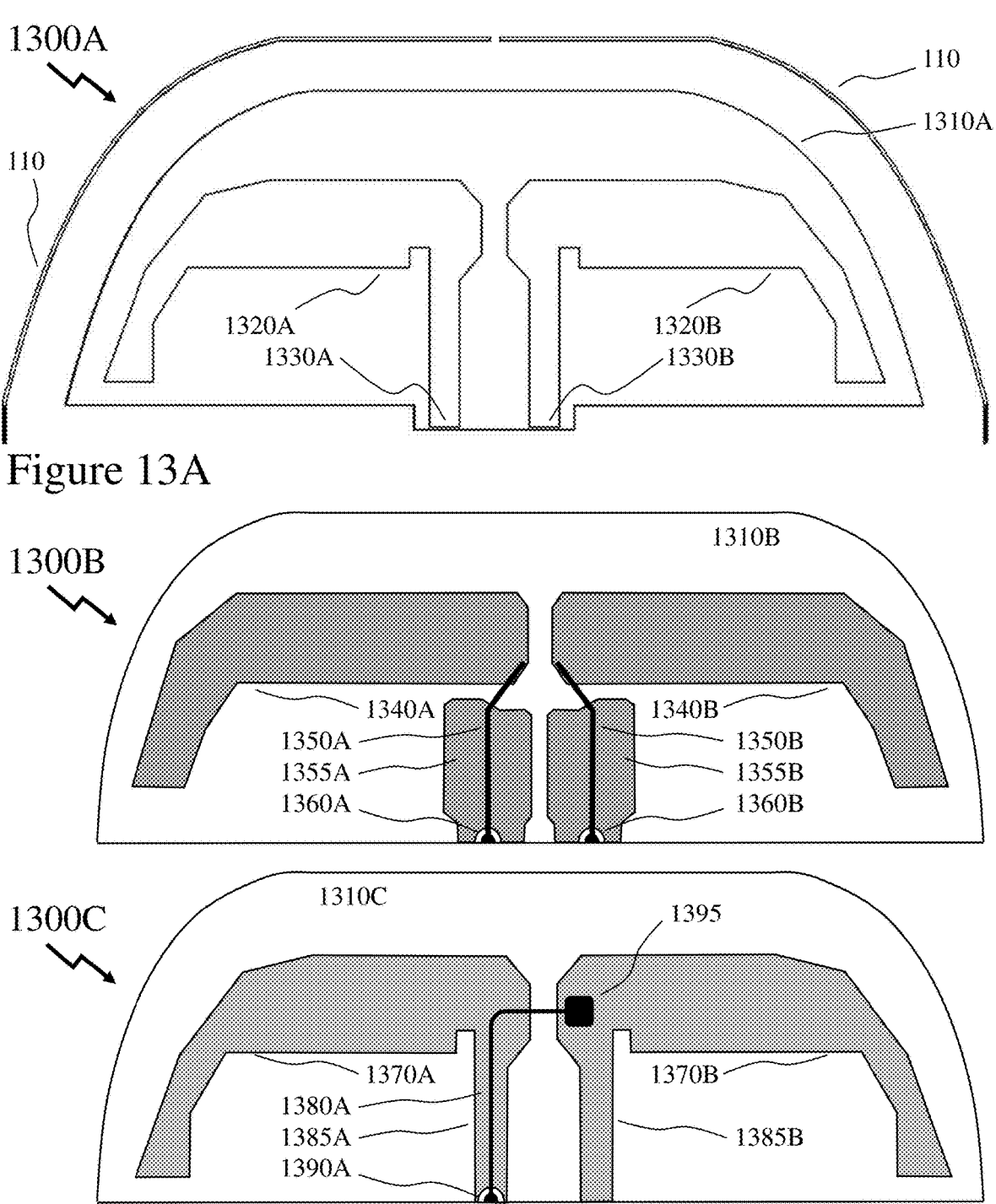
FIG. 13A depicts a cross-sectional view of an antenna according to an embodiment of the invention exploiting a dipole electromagnetically coupled to a pair of petals.
FIG. 13B depicts dipole structures with dual feed points (FPs) and single FP with integrated balun respectively according to embodiments of the invention.

Accordingly, referring to FIG. 13A the minimum structure for an antenna is depicted in cross-sectional view 1300A embodying these design elements is presented comprising a pair of Petals 110 with a dipole formed from first and second Dipole Elements 1320A and 1330A. As depicted the first and second Dipole Elements 1320A and 1320B are formed upon a Carrier 1310A, e.g. a PCB, and are coupled to first and second feed points (FPs) 1330A and 1330B respectively. A plan view 1100 of the pair of petals 110 is depicted in FIG. 11 with the two Petals 110 evident opposite each other with a common central axis X-X which would be aligned with the carrier 1310 and the first and second dipole elements 1310A and 1310B respectively. Also depicted in plan view 1100 at the distal ends of each Petal 110 are a pair of Tabs 130 as described below in respect of FIG. 1 and Solder Pads 1010 as described below in respect of FIG. 10. As depicted the pair of Petals 110 are joined via an unmetallized portion of the carrier, Element 1110, which the Petals 110 have been formed upon.

Referring to FIG. 13B there are depicted first and second electrical configurations 1300B and 1300C respectively for coupling a dipole to an external electrical circuit. In first electrical configuration 1300B a first Dipole Element 1340A is coupled to a first FP 1360A via first Track 1350A which is part of a first Transmission Line 1355A between the first FP 1360A and the first Dipole Element 1340A. Similarly, a second Dipole Element 1340B is coupled to a second FP 1360B via second Track 1350B which is part of a second Transmission Line 1355B between the second FP 1360B and the second Dipole Element 1340B. Accordingly, the dipole depicted in first electrical configuration 1300A is driven through both first FP 1360A and second FP 1360B. Optionally, the first and second Dipole Elements 1320A and 1320B are also implemented on the other side of the Carrier 1310B where the two electrical structures on either side of the Carrier 1310B are electrically connected through a plurality of vias, not depicted for clarity.

In second electrical configuration 1300C a first Dipole Element 1370A is coupled to a first FP 1390A via first Feed Track385A and a second Dipole Element 1370B is coupled to a second Feed Track385B. Also depicted coupled to the first FP 1390A and the second Dipole Element 1370B is a first Transmission Line 1380A which terminates in Pad 1395 upon the second Dipole Element 1370B. Accordingly, in contrast to first electrical connection 1300B where dipole comprising the first and second Dipole Elements 1340A and 1340B are each coupled to unbalanced lines from the first and second FPs 1360A to 1360B the dipole in second electrical configuration 1300C is fed from a single FP 1390 and incorporates a balanced-unbalanced (balun) connection so that the first and second Dipole Elements 1370A and 1370B operate in a balanced manner with an unbalanced feed from first FP 1390A.

Beneficially, in contrast to first electrical configuration 1300B the integrated balun in second electrical configuration 1300C has an electrical impedance close to a target 50Ω impedance where matching to the target 50Ω impedance at the FP 1390A is achieved through the appropriate design parameters for the transmission line comprising first Feed Track385A and first Transmission Line 1380A. Optionally, the first and second Dipole Elements 1370A and 1370B with or without the first and second Feed Tracks385A and 1385B respectively are also implemented on the other side of the Carrier 1310B where the two electrical structures on either side of the Carrier 1310C are electrically connected through a plurality of vias, not depicted for clarity.

These GNSS antenna employing receiving elements each comprising a pair of opposing petals which are electromagnetically coupled to a dipole and therein to an RF receiver circuit. Subsequently, an overview of the operating principle of a GNSS antenna employing said receiving elements comprising a pair of opposing petals which are electromagnetically coupled to a dipole is presented.

Referring to FIGS. 1A and 1B there are depicted lower and upper perspective views 100A and 100B respectively of a GNSS antenna according to an embodiment of the invention. Considering initially lower perspective view 100A of a GNSS Antenna according to an embodiment of the invention in FIG. 1A an array of Petals 110 is mounted to a printed circuit board (PCB) 120 via Tabs 130 on the Petals 110 inserted into slots within the PCB 120. This mounting of a substrate upon which the Petals 110 form metallized regions being depicted and described below in more detail with respect to FIG. 12. Disposed upon the PCB 120 is Electronics 140 which is coupled to RF Connector 150 and to a plurality of dipoles, not visible within lower perspective view 100A but disposed within the GNSS antenna according to an embodiment of the invention. Now referring to upper perspective view 100B of the GNSS Antenna according to an embodiment of the invention in FIG. 1B the array of Petals 110 is similarly depicted mounted to a printed circuit board (PCB) 120. As depicted in FIG. 1B the array of Petals 110 comprises eight (8) Petals 110 although as described and depicted below in respect of FIGS. 10 to 12 an antenna exploiting embodiments of the invention may employ 2 or 4 Petals 110. However, other counts of Petals 110 may be employed where N, the number of Petals 110, is an even integer. Also depicted in FIG. 1B are Mounting Holes 160 within the PCB 120 for attaching the antenna to a radome, base of a radome, a choke ring etc.

Figure 6:
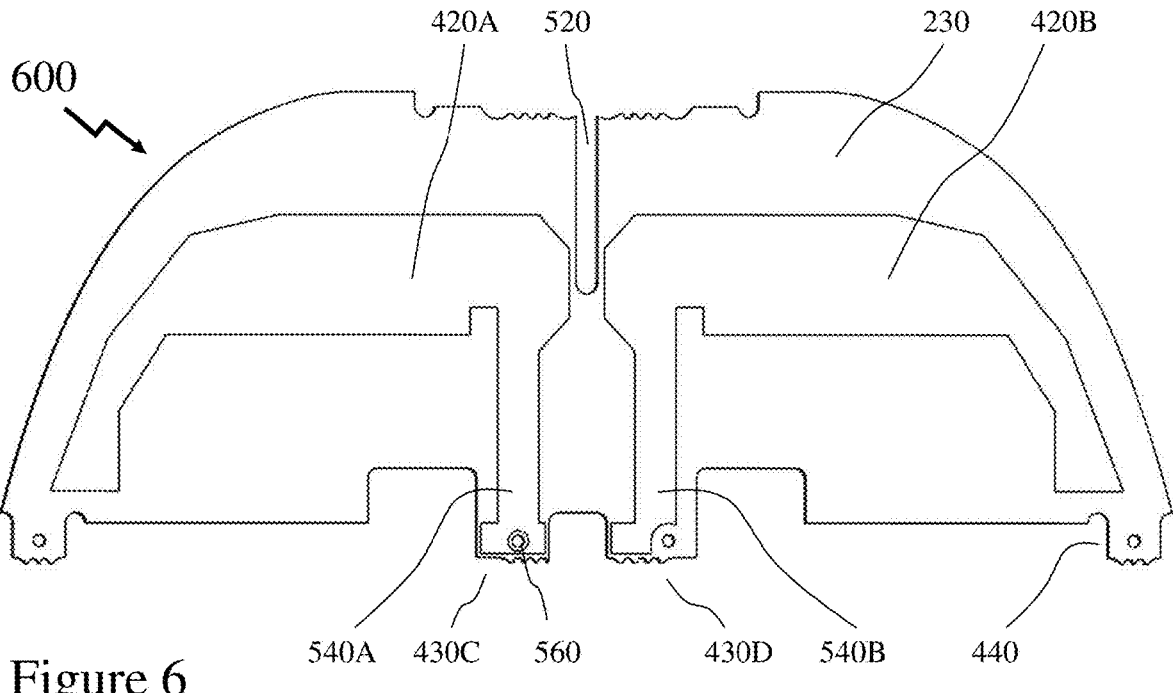
Figures 7A, 7B:
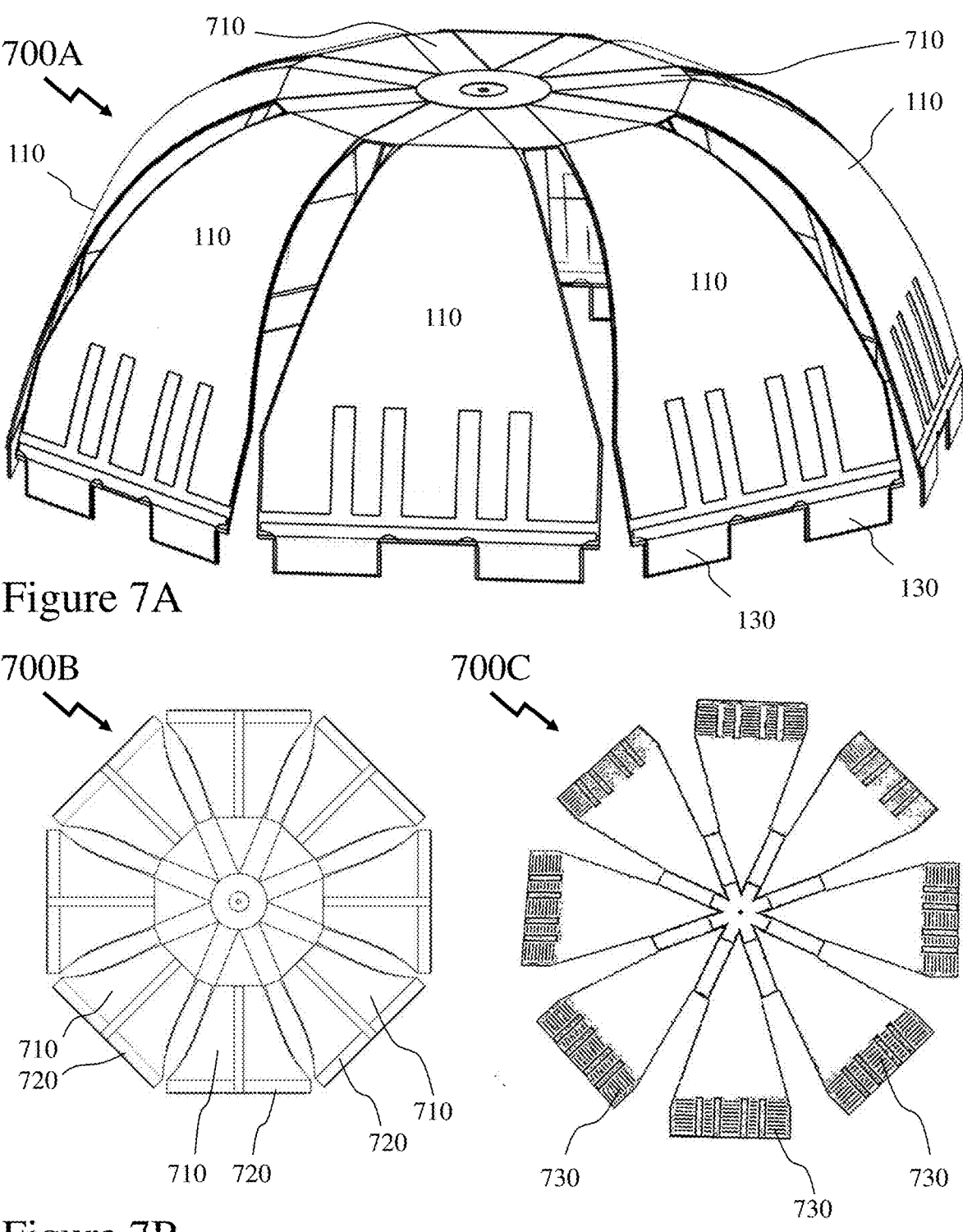
FIG. 7A depicts a perspective view of a petal assembly comprising an array of petals for a GNSS antenna according to an embodiment of the invention.
FIG. 7B depicts a plan perspective schematic view and photograph of arrays of petals for GNSS antennae according to embodiments of the invention.
Figure 7C:
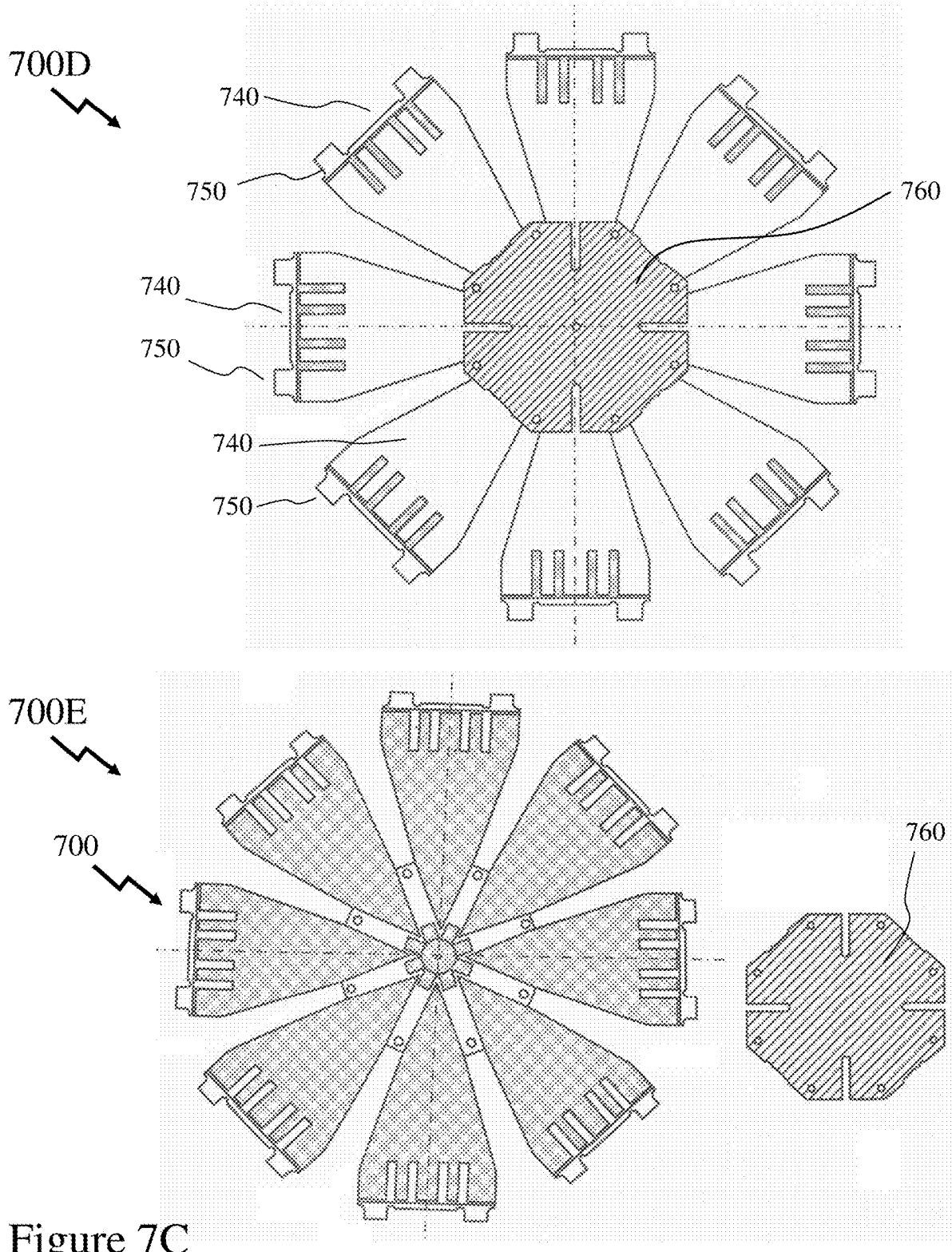
FIG. 7C depicts plan perspective schematic views of an array of petals for a GNSS antenna according to an embodiment of the invention.
Figures 8, 9:
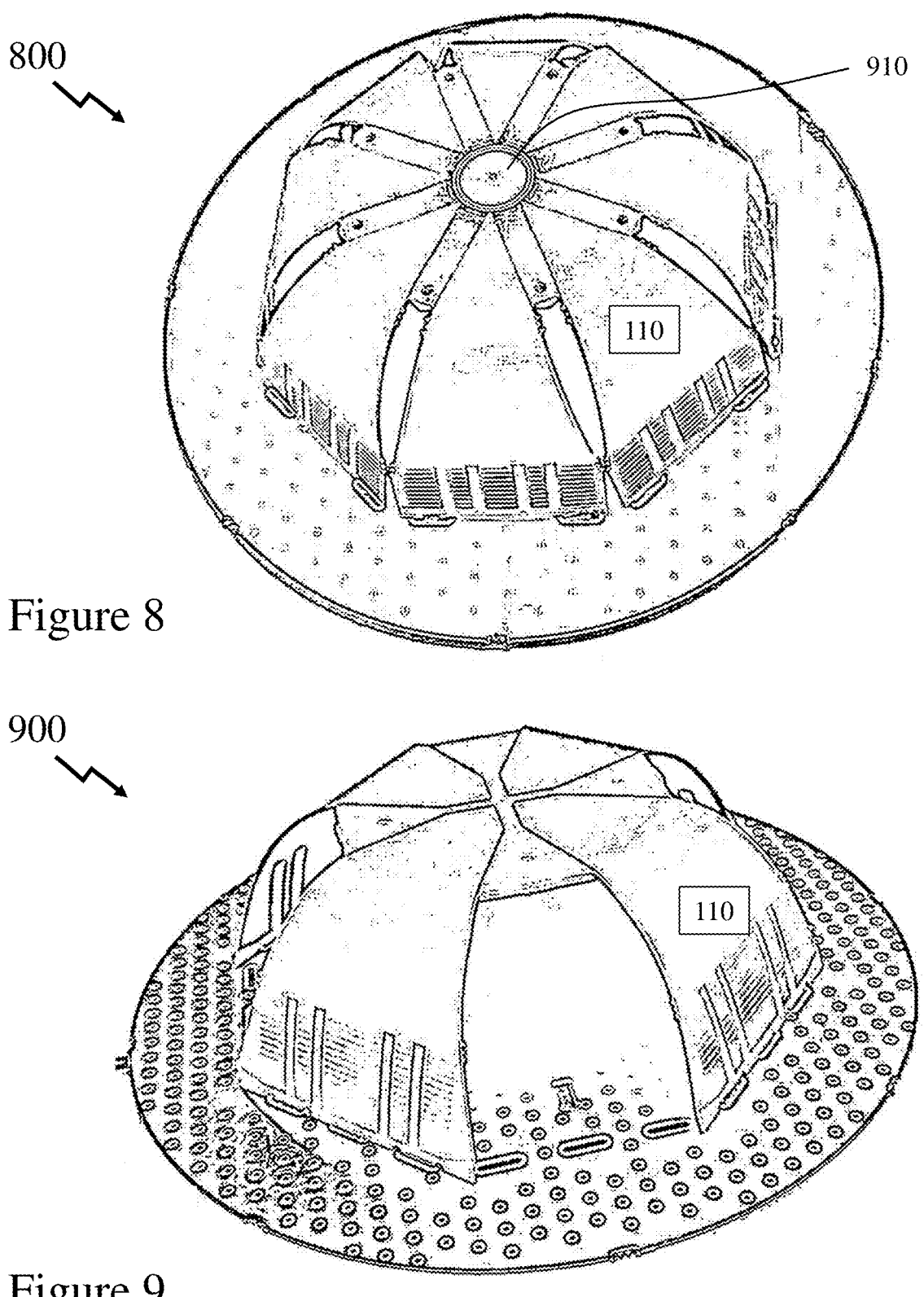
FIG. 8 depicts a photograph of a GNSS antenna according to an embodiment of the invention employing 8 petals within the array of petals.
FIG. 9 depicts a photograph a GNSS antenna according to an embodiment of the invention employing 4 petals within the array of petals.

Within FIGS. 1A and 1B are first and second Artefacts 170A and 170B which are artefacts arising from the computer aided design (CAD) software employed in generating the images presented within FIG. 1A to 6 respectively, FIGS. 6A to 7B respectively, and FIG. 8. First Artefacts 170A being the sides of elements within the array of Petals 110 which support the carrier(s) and/or substrate(s) onto which the array of Petals 110 is implemented via metallization and/or the Petals 110 directly. Second Artefacts 170B being the tops of these elements. As such first and second Artefacts 170A and 170B arise due to the CAD software treating the carrier for the array of Petals 110 and/or the Petals 110 as transparent.

The Electronics 140 provides a microwave/RF circuit which, in the instance that the GNSS antenna is a receiver, combines the received RF/microwave signals at the feed points (FPs) of the plurality of dipoles to generate an RF/microwave output signal coupled to the RF Connector 150. Accordingly, considering the instance of a pair of dipoles disposed at right angles to one another then there are 4 FPs. The Electronics 140 thereby comprises a pair of hybrid couplers, which each couple the RF/microwave signals from a pair of FPs to a common output port, and a balun, which receives the signals from the common output ports of the pair of hybrid couplers and combines them to generate the signal coupled to the RF Connector 150 at the output of the Balun. Where the microwave/RF signals from the FPs have a relative phase difference sequentially of 0°, 90°, 180°, and 270° then these signals are initially combined within each of the hybrid couplers and then within the Balun. Accordingly, based upon this described sequence of phases coupled from the FPs to the hybrid couplers the GNSS antenna may operate to receive right hand circularly polarized signals. Alternatively, the GNSS antenna may be configured to receive left hand circularly polarized signals or within other embodiments of the invention provide a GNSS antenna for a transmitter generating right hand polarized signals or left hand polarized signals. Optionally, within other embodiments of the invention the Balun may be a transformer. Within FIG. 1A the four FPs are located within Region 180 projecting through the PCB 120.

Whilst the embodiments of the invention described and depicted below in respect of FIGS. 2 to 10B employ a pair of orthogonally disposed dipoles providing 4 FPs with each dipole coupled to a pair of Petals 110 such that the GNSS antenna operates with relative phase differences of 0°, 90°, 180°, and 270° other configurations may be implemented without departing from the scope of the invention. For example, as described above and depicted in FIG. 13B with respect to second electrical configuration 1300C, the dipoles may employ integrated baluns such that only a pair of FPs are required, one for each dipole, where the balun provides the out-of-phase phase differences for the pair of dipole elements within each dipole. Further, as described and depicted in FIGS. 11 and 13A an antenna may employ a single dipole with a single pair of Petals 110. Within another configuration an antenna may employ three dipoles mounted at 1200 to each other with 6 Petals 110 such that the antenna receives or transmits signals with relative phase differences of 0°, 60°, 120°, 180°, 240° and 270°. It would be evident that other configurations could be implemented without departing from the scope of the invention.

Figures 2, 3A:
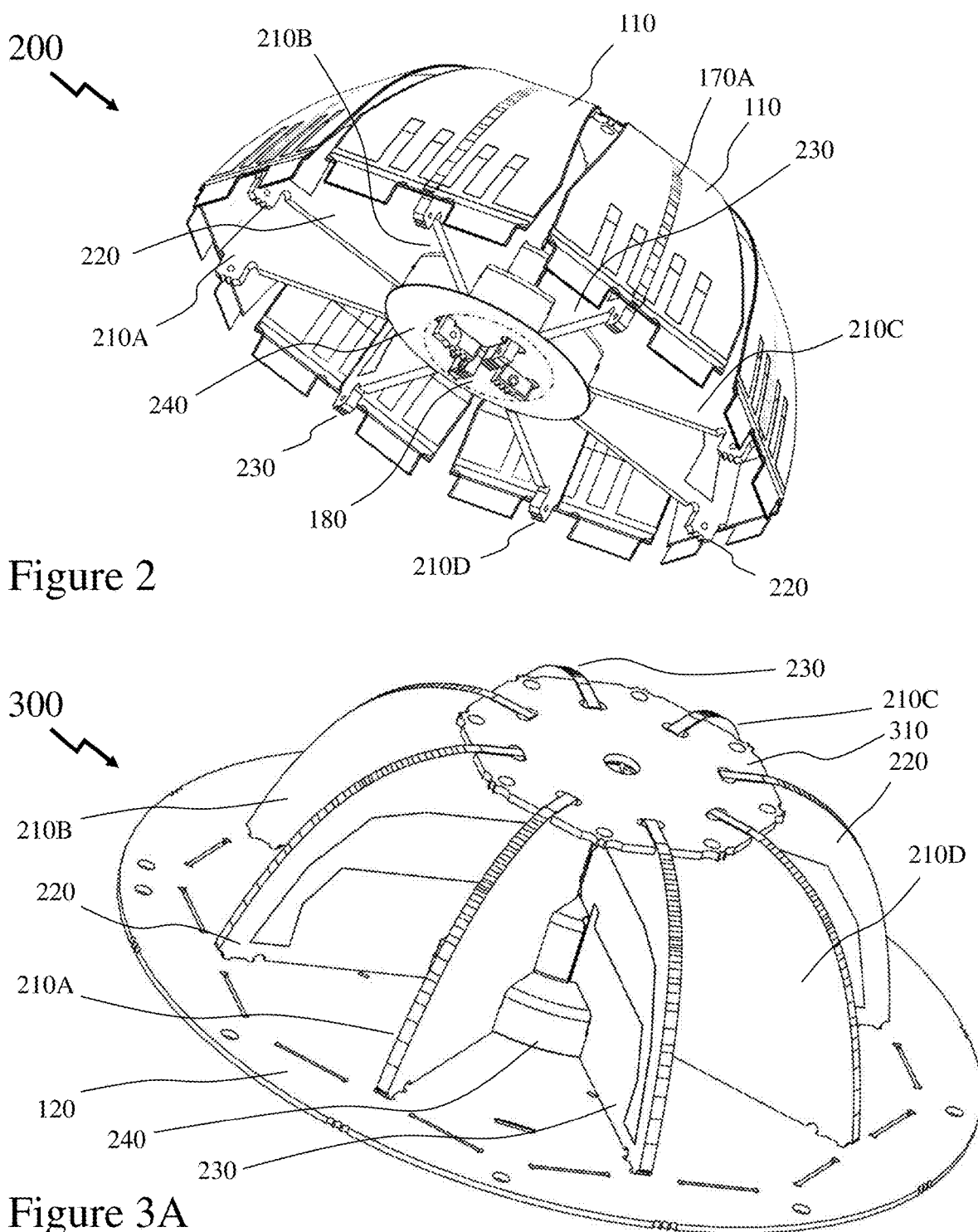
FIG. 2 depicts a lower perspective view of a GNSS antenna according to an embodiment of the invention with the printed circuit board (PCB) removed.
FIG. 3A depicts an upper perspective view of a GNSS antenna according to an embodiment of the invention with petals removed.

Now referring to FIG. 2 there is depicted a lower perspective view 200A of a GNSS antenna according to an embodiment of the invention with the PCB 120 removed. Accordingly, FIG. 2 depicts a similar perspective to that of lower perspective view 100A in FIG. 1A with the PCB 120 removed. Accordingly, the array of Petals 110 is depicted together with the first Artefacts 170A. Also depicted is an Isolation Block 240 through the bottom of which project the FPs within Region 180. The FPs being formed upon the dipoles, a pair of FPs being disposed upon a first circuit board Dipole A 220 and a further pair of FPs disposed upon a second circuit board Dipole B 230. Dipole A 220 and Dipole B 230 being disposed orthogonally to one another. Also depicted are first to fourth Supports 210A to 210D where these are disposed radially within the GNSS antenna. Each of the first to fourth Supports 210A to 210D being disposed between one end of Dipole A 220 and an end of Dipole B 230. Accordingly, the first to fourth Supports 210A to 210D support additional Petals 110 within the array of Petals 110 which are disposed between the Petals 110 associated with the Dipole A 220 and Dipole B 230.

Referring to FIG. 3A there is depicted an upper perspective view 300 of a GNSS antenna according to an embodiment of the invention with the array of Petals 110 removed. Accordingly, FIG. 3A depicts a similar perspective to that of upper perspective view 100B in FIG. 1B with the array of Petals 110 removed. Accordingly, there are depicted the orthogonally disposed Dipole A 220 and Dipole B 230 together with the first to fourth Supports 210A to 210D respectively. Located at the centre is Isolation Block 240. It would be evident from lower perspective view 100A in FIG. 1A, lower perspective view 200 in FIG. 2 respectively, and upper perspective view 300A in FIG. 3A that an outer end of each of the Dipole A 220, Dipole B 230, and first to fourth Supports 210A and 210D comprises a projection which fits within a slot within the PCB 120 locating each outer end.

The middle portion of each of Dipole A 220 and Dipole B 230 comprises FPs which similarly fit through slots within the PCB 120 in the Region 150 and engage with slots formed within the Isolation Block 240. The lower inner ends of each of the first to fourth Supports 210A to 210D also engage with features on the external surface of the Isolation Block 240. The orientation of each of the Dipole A 220, Dipole B 230 and first to fourth Supports 210A to 210D respectively being defined by these engagements with the PCB 120 and Isolation Block 240 and the Support Frame 310 where the upper region of each of these elements engages a slot within the Support Frame 310. Accordingly, each of the Dipole A 220, Dipole B 230 and first to fourth Supports 210A to 210D respectively are orientated substantially perpendicular to the PCB 120. It would be evident to one of skill in the art that other mechanical means to locate, orientate and retain the Dipole A 220, Dipole B 230 and the first to fourth Supports 210A and 210D may be employed without departing from the scope of the invention.

Figures 3B, 4:
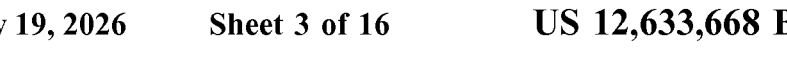
FIG. 3B depicts a partially exploded assembly of the dipole circuits, supports and mounting block for a GNSS antenna according to an embodiment of the invention.
FIG. 4 depicts an exploded perspective view of a pair of orthogonally positioned dipoles for a GNSS antenna according to an embodiment of the invention.

Now referring to FIG. 3B there is depicted a partially exploded assembly 300B of the Dipole A 220, Dipole B 230, first to fourth Supports 210A to 210D and Mounting Block 240 for a GNSS antenna according to an embodiment of the invention. Evident on the Mounting Block 240 are the slots allowing insertion of the Dipole A 220 and Dipole B 230 so that the FPs project through the bottom of the Mounting Block 240 and therein the PCB 120 in the final assembly. Also evident are the slots for engaging the inner lower portions of the first to fourth Supports 210A to 210D respectively.

In addition to providing a mechanical alignment of Dipole A 220 and Dipole B 230 the Mounting Block 240 also provides a benefit in the microwave/RF domain for performance of a GNSS antenna according to an embodiment of the invention. As evident in FIGS. 3B-6 respectively each of Dipole A 220 and Dipole B 230 is depicted as being configured according to the description above and as depicted in respect of second electrical configuration 1300C in FIG. 13 with the exception that the transmission line, balun etc. have been omitted for clarity. Accordingly, when assembled Dipole A 220 and Dipole B 230 have disposed closed to the point they intersect a pair of metallized lines (one from each of Dipole A 220 and Dipole B 230) run vertically parallel to one another thereby forming another parasitic transmission line through the intervening medium, e.g. air where no Mounting Block 240 is provided. Where the metallization is only on one side of each of Dipole A 220 and Dipole B 230 then a single parasitic transmission line may be formed whilst when both sides of each of Dipole A 220 and Dipole B 230 are metallized then four parasitic transmission lines may be formed. Where the dielectric between these parallel traces on Dipole A 220 and Dipole B 230 is air then the frequency at which these parasitic transmission lines "operate" may be within the operating frequency range of the GNSS antenna resulting in unwanted coupling, crosstalk, and loss etc. Accordingly, the Mounting Block 240 provides a different dielectric constant for part or all of each parasitic transmission line wherein appropriate selection of the material and hence dielectric constant of the Mounting Block 240 the es the frequency at which these parasitic transmissions lines "operate" outside the operating frequency range of the GNSS antenna.

Now referring to FIG. 4 there is depicted an exploded perspective view 400 of a pair of orthogonally positioned dipoles for a GNSS antenna according to an embodiment of the invention.

Within exploded perspective view 400 Dipole A 220 and Dipole B 230 are depicted separated vertically. Dipole A 220 having first and second Dipole Metallizations 410A and 410B each forming one half of a dipole. First Dipole Metallization 410A being electrically coupled to first FP 430A at the left central lower portion of Dipole A 220 whilst second Dipole Metallization 410B is electrically coupled to second FP 430B at the right central lower portion of Dipole A 220. Similarly, third Dipole Metallization 420A is electrically coupled to third FP 430C at the left central lower portion of Dipole B 230 whilst fourth Dipole Metallization 420B is electrically coupled to fourth FP 430D at the right central lower portion of Dipole B 230. First to fourth FPs 430A to 430D being the FPs evident within the central Region 180 in lower perspective view 100A in FIG. 1 and lower perspective views 200A and 200B in FIGS. 2 and 2B respectively. Also depicted in assembled and exploded perspective views 400A and 400B in FIGS. 4 and 4B respectively are Mounting Tabs 440 at the outer lower portion of each of Dipole A 220 and Dipole B 230. The Mounting Tabs 440 engaging slots within the PCB 120 for mounting the Dipole A 220 and Dipole B 230 to the PCB 120 and defining their relative orientation through the precision of the slots within the PCB 120 being at 90° to one another for mounting Dipole A 220 and Dipole B 230 respectively.

Alternatively, within another embodiment of the invention such as described above and depicted in FIG. 13B with respect to second electrical configuration 1300C, the dipoles may employ integrated baluns such that only a pair of FPs are required, one for each dipole. Accordingly, in this configuration the second FP 230B and third FP 230C may be coupled to the external microwave/RF circuit such that the first and second Dipole Metallizations 410A and 410B are coupled via the integrated balun (not shown for clarity) to second FP 430B and third and fourth Dipole Metallizations 420A and 420B are coupled via another integrated balun (not shown for clarity) to third FP 430C. Within other embodiments of the invention second FP 430B may be replaced with first FP 430A and/or third FP 430C may be replaced with fourth FP 430D where the integrated baluns are employed.

As depicted Dipole A 220 and Dipole B 230 have interlocking slots that provide for assembly of the crossed dipole arrangement according to an embodiment of the invention. However, within other embodiments of the invention other assembly configurations may be employed without departing from the scope of the invention to provide the pair of crossed dipoles using 2, 3, or 4 elements and other means of attachment and assembly without departing from the scope of the invention. The upper central edges of Dipole A 220 and Dipole B 230 as depicted within the embodiment of the invention are profiled to include an indent to support a stiffener attached to the flexible circuit forming the array of Petals 110 such as Support Frame 310 depicted and described above in respect of FIG. 3A. The upper edges of Dipole A 220 and Dipole B 230 provide mechanical support for the respective Petals 110 of the array of Petals 110 to which they are associated. The array of Petals 110, may, within an embodiment of the invention be formed from a semi-flexible or flexible PCB with the array of Petals 110 imprinted in metallization upon the semi-flexible or flexible PCB.

By appropriate design and attachment of the array of Petals 110 within the GNSS antenna relative to the Dipole A 220 and Dipole B 230 then the semi-flexible or flexible PCB and hence the array of Petals 110 are in mechanical contact with the upper edges of Dipole A 220 and Dipole B 230 such that the electromagnetic coupling between the narrow band dipoles, Dipole A 220 and Dipole B 230, and the opposed metallized Petals 110 is determined by the predetermined distance between the metallized Petals 110 and the metallized dipoles imprinted on the dipoles thereby implementing a distributed feed network, wherein each of the metallized petals are devoid of direct connection to the external microwave/RF circuit, such as Electronics 140 depicted in FIG. 1A.

Figure 5:
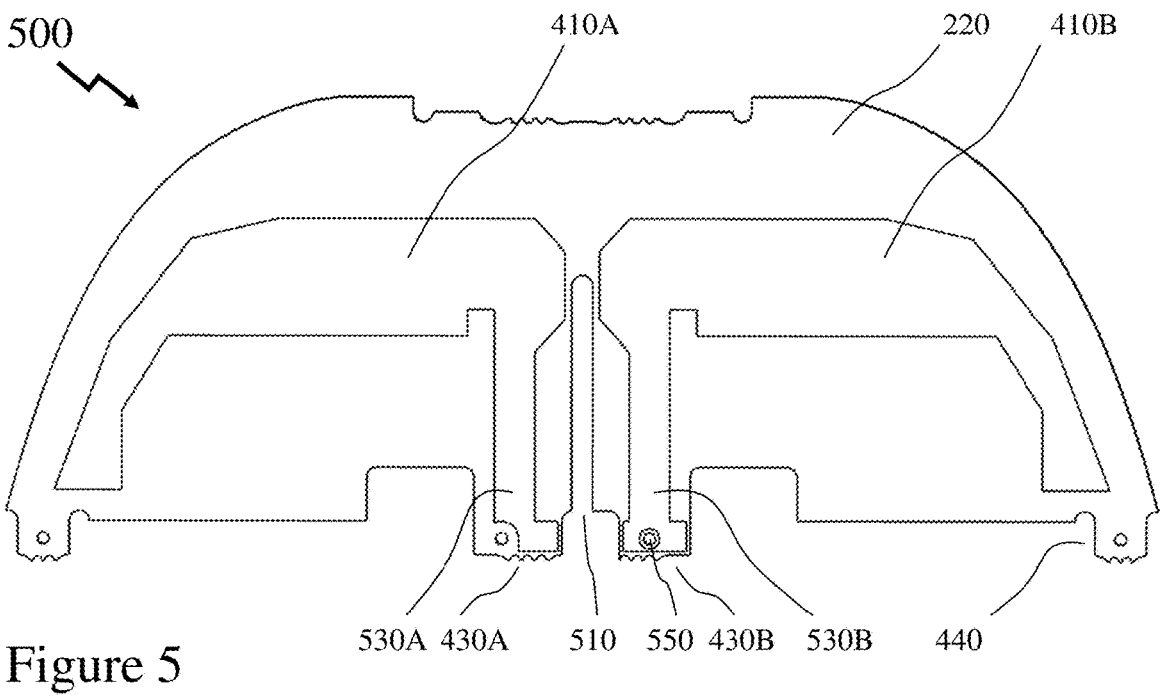
FIGS. 5 and 6 depict the pair of dipoles forming the pair of dipoles for a GNSS antenna according to an embodiment of the invention.

Accordingly, referring to FIGS. 5 and 6 there are depicted first and second images 500 and 600 respectively for the pair of dipoles for a GNSS antenna according to an embodiment of the invention. Referring to first image 500 in FIG. 5 there is depicted a schematic of Dipole A 220 showing first Dipole Metallization 410A electrically coupled to first FP 430A at the left central lower portion of Dipole A 220 whilst second Dipole Metallization 410B is electrically coupled to second FP 430B at the right central lower portion of Dipole A 220. Also depicted is first Slot 510 which allows Dipole A 220 to be assembled with the Dipole B 230 which has a corresponding second Slot 520. Further, as described in respect of first and second electrical configurations 1300B and 1300C respectively in FIG. 13B the Dipole A 220 may also have first and second Dipole Metallizations 410A and 410B implemented on the other side of Dipole A 220 where these two sides are electrically connected through a plurality of vias.

Referring to second image 600 in FIG. 6 there is depicted a schematic of Dipole B 230 showing third Dipole Metallization 420A electrically coupled to third FP 430C at the left central lower portion of Dipole B 230 whilst fourth Dipole Metallization 420B is electrically coupled to fourth FP 430D at the right central lower portion of Dipole B 230. Also depicted is second Slot 520 which allows Dipole B 230 to be assembled with the Dipole A 220 which has a corresponding first Slot 510. Further, as described in respect of first and second electrical configurations 1300B and 1300C respectively in FIG. 13B the Dipole B 230 may also have third and fourth Dipole Metallizations 420A and 420B implemented on the other side of Dipole A 220 where these two sides are electrically connected through a plurality of vias.

The first image 500 in FIG. 5 and second image 600 in FIG. 6 representing Dipole A 220 and Dipole B 230 for the configuration described and depicted in respect of second electrical configuration 1300C in FIG. 13B wherein each of Dipole A 220 and Dipole B 230 comprise integrated baluns. In each of first image 500 in FIG. 5 and second image 600 in FIG. 6 only the ground tracks are depicted and the microstrip feed line, first Transmission Line 1380A and its electrical connection to the dipole element, Pad 1395, are omitted for clarity. Accordingly, referring to first image 500 in FIG. 5 the first Dipole Metallization 410A is coupled to first FP 430A via a first Trace 530A and the second Dipole Metallization 410B is coupled to second FP 430A via a second Trace 530B. Similarly, third Dipole Metallization 420A is coupled to third FP 430C via a third Trace 540A and the fourth Dipole Metallization 420B is coupled to fourth FP 430D via a second Trace 540B. The microstrip line, not depicted for clarity, for Dipole A 220 is coupled to the external microwave/RF feed at first Coupling Point 550. Similarly, the microstrip line, not depicted for clarity, for Dipole B 230 is coupled to the external microwave/RF feed at second Coupling Point 560. In this configuration the first FP 430A and fourth FP 430D are connected to ground and each of Dipole A 220 and Dipole B 230 are each connected to a single microwave/RF signal. In this configuration an external microwave/RF feed network provides or receives 2 microwave/RF signals to an antenna comprising Dipole A 220 and Dipole B 230.

Within an alternate embodiment of the invention Dipole A 220 and Dipole B 230 do not include integrated baluns. Accordingly, the first Trace 530A and second Trace 530B may be symmetrical mirror images and each is connected to its respective first and second FPs 430A and 430B respectively such that a pair of microwave/RF signals are coupled to/from Dipole A 220. Similarly, the third Trace 530A and fourth Trace 530B may be symmetrical mirror images and each is connected to its respective third and fourth FPs 430C and 430D respectively such that a pair of microwave/RF signals are coupled to/from Dipole B 230. In this configuration an external microwave/RF feed network provides or receives 4 microwave/RF signals to an antenna comprising Dipole A 220 and Dipole B 230.

As depicted in first image 500 in FIG. 5 the lower edge of Dipole A 220 comprises first FP 430A and second FP 430B towards the center and Mounting Tabs 440 at the outer edges. The upper edge defines a central region for supporting a stiffener, e.g. Support Frame 310, and the array of Petals 110 whilst the outer upper edges define the curved surfaces to which the array of Petals 110 conforms when attached. Similarly, as depicted in second image 600 in FIG. 6 the lower edge of Dipole B 230 comprises third FP 430C and fourth FP 430D towards the center and Mounting Tabs 440 at the outer edges. The upper edge defines a central region for supporting a stiffener, e.g. Support Frame 310, and the array of Petals 110 whilst the outer upper edges define the curved surfaces to which the array of Petals 110 conforms when attached.

As noted above a first dipole of the pair of cross dipoles, Dipole A 220, is formed from the first and second Dipole Metallizations 410A and 410B respectively whilst the second dipole, Dipole B 230, is formed from third and fourth Dipole Metallizations 420A and 420B respectively. Considering an embodiment of the invention where Dipole A 220 and Dipole B 230 are formed upon a Dipole PCB then each dipole thereby comprises a pair of centrally disposed vertical metal traces which connect to the dipole elements at the inner end of each dipole metallization trace. The dipole PCB may be of substantially equal thicknesses to attachment slots within the PCB 120 to allow for accurate mounting of the dipoles relative to the ground plane formed within or upon PCB 120. Optionally, each Dipole PCB may include identical copies of a balun.

As noted above the upper edges of Dipole A 220 and Dipole B 230 define the predetermined distance between the metallized Petals 110 and the metallized dipoles imprinted on the dipoles thereby implementing a distributed feed network between the dipoles and Petals 110. In this manner the Petals 110 are devoid of a direct connection to the FPs and the microwave/RF circuit. However, it would be evident from FIGS. 5 and 6 that within the embodiment of the invention presented the dipoles vary in geometry radially and that the separation of the dipole metallization from the Petal 110 associated with it varies radially or from a different perspective varies with elevation angle. This separation of petal-dipole separation as a function of elevation angle being predetermined in dependence upon the GNSS antenna design such that either the upper edge of dipole elements is defined from the petal geometry or vice-versa. It would also be evident that the length of the dipole elements from their inner edge towards the middle of each of Dipole A 220 and Dipole B 230 to their outer point at the lower outer region of each of Dipole A 220 and Dipole 230 is determined by the requirement for the dipole elements to be electrically λ/4 at the central frequency of the GNSS antenna. The inventors also established that whilst meeting this requirement and implementing the associated Petals 110 that the sensitivity of the impedance of the structure was less sensitive to the distance between the Petal 110 and dipole element towards the centre of the dipole allowing for increased flexibility in the overall design for the geometry of the Petals 110 relative to dipole. Accordingly, as visible in FIG. 5 the distance of the upper edge of the dipole elements relative to the upper edge of the PCB they are formed upon varies. However, within other embodiments of the invention this separation between dipole metallization and Petal 110 may be constant.

Now referring to FIG. 7A there is depicted a perspective view 700A of the array of Petals 110, namely a petal assembly, for a GNSS antenna according to an embodiment of the invention. As depicted the array of Petals 110 comprises 8 Petals 110 which are metallized regions upon an insulating Former 710. At the lower end of each Petal 110 are a pair of Tabs 130 which as described and depicted in FIG. 1A are employed to mount and attach the Petals 110 to the PCB 120, not depicted for clarity. Within the embodiment of the invention depicted metallization upon the Tabs 130 may be soldered to the PCB 120. This metallization upon the Tabs 130 being electrically isolated from the metallization forming the Petals 110. Within an embodiment of the invention the metallization on the Tabs 130 is connected to a ground plane of the PCB 120. It would be evident that within other embodiments of the invention the lower ends of the Petals 110 may be attached to the PCB 120 by other means including mechanical retention, mechanical attachment, or attachment via a material such as a resin, glue, or epoxy. Within other embodiments of the invention the Petals 110 may be mechanically retained in position by one or more additional elements mounted external to the Petals 110 connected to the PCB 120 and/or Dipole A 220/Dipole B 230 and/or the first to fourth Supports 210A to 210D respectively without the use of projections such as Tabs 130.

Referring to FIG. 7B there are depicted a plan perspective schematic view 700B and a photograph 700C of arrays of petals for GNSS antennae according to embodiments of the invention. Referring to schematic view 700B there an array of Petals 710 is depicted comprising 8 Petals 710. In this instance, the ends of the Petals 710 from the center end in Tabs 720. Photograph 700C depicts a photograph of an array of Petals 730 according to an embodiment of the invention which do not have end tabs as the Petals 730 are retained by a mechanical means, e.g. a circular projection above the PCB 120 against which the Petals 730 push when flexed and mounted at the center.

Now referring to FIG. 7C there are depicted plan schematics in assembled and unassembled views 700D and 700E respectively for an array of Petals 740 for a GNSS antenna according to an embodiment of the invention. As depicted in assembled view 700D each Petal 740 has a Tab 750 at a distal end from the centre of the array of Petals 740 and a Support Frame 760. In unassembled view 700E in FIG. 7C the then Array 700 comprises the array of Petals 740 for a GNSS antenna according to an embodiment of the invention and is depicted separate from the Support Frame 760. Within other embodiments of the invention the Support Frame 760 may be omitted. Support Frame 760 may provide Support Frame 310 as depicted in FIG. 3A which engages the upper central portions of the dipole PCBs and/or supports. Optionally, within other embodiments of the invention the Support Frame 760 may be integrated as part of the array of petals.

When the Central Support 760 is used, such as depicted in FIG. 3A with Support Frame 310, the shape of the upper edge of Dipole A 220, Dipole B 230, and first to fourth Supports 210A to 210D respectively may each include an indent to accommodate the Central Support 760 attached to a semi-flexible PCB forming Array 700 upon which the Petals 740 are formed. Alternatively, the Central Support

760 may include indents to accommodate the upper edges of Dipole A 220, Dipole B 230, and first to fourth Supports 210A to 210D respectively. The Central Support 760 may be fabricated with a low loss dielectric substrate with the same shape and dimensions as the central region of the upper portion of the dipole assembly comprising the Dipole A 220, Dipole B 230, and first to fourth Supports 210A to 210D respectively. As depicted in unassembled view 700E in FIG. 7C the Central Support 760 is an octagonal substrate, for example formed from a glass-reinforced epoxy laminate material which is attached to the semi-flexible PCB forming the Array 700 using an adhesive, for example. The combination of the metallized petal assembly, Array 700, and the Central Support 760 yields a sub-assembly comprised of a rigid central region and semi-flexible petals in which each metallized petal is supported by a dipole of Dipole A 220 and Dipole B 230 and the first to fourth Supports 210A to 210D respectively. It would be evident that within other embodiments of the invention the geometry of the Support Frame 760 may vary, including for example circular.

Within FIGS. 1A to 7C the array of Petals 110, for example Petal Assembly 800, are depicted where the Petals 110 are a layer of metallization upon a flexible or rigid (formable) substrate. Whilst this provides a design with ease of manufacturing the array of Petals 110 and assembling the GNSS antenna it would be evident that within other embodiments of the invention the Petals 110 may be discretely manufactured and assembled with the other components for form the GNSS antenna.

Now referring to FIG. 8 there is depicted a photograph 800 of a GNSS antenna according to an embodiment of the invention employing 8 petals within the array of petals. Disposed at the upper center of the array of petals a circular Disk 910 of metallization is patterned on the substrate of the array of petal elements. The Disk 910 being at the center between each pair of opposed petal elements and is a common center for all opposed petal pairs. The metallized Disk 910 provides a controlled capacitance to a virtual ground, by virtue of the antipodal voltages present at the narrow petal tips of the Petal Elements 110. This Disk 910 is also visible within the views of GNSS antenna and arrays of Petal 110 depicted in FIGS. 1B, 7A, and 7C-7D respectively but was not identified explicitly within the descriptions of these Figures.

Referring to FIG. 10 there is depicted a photograph 900 a GNSS antenna according to an embodiment of the invention employing 4 Petals 110 within the array of petals. This being the minimum configuration of Petals 110 for a GNSS antenna employing a pair of orthogonal dipoles.

Figures 10A, 10B:
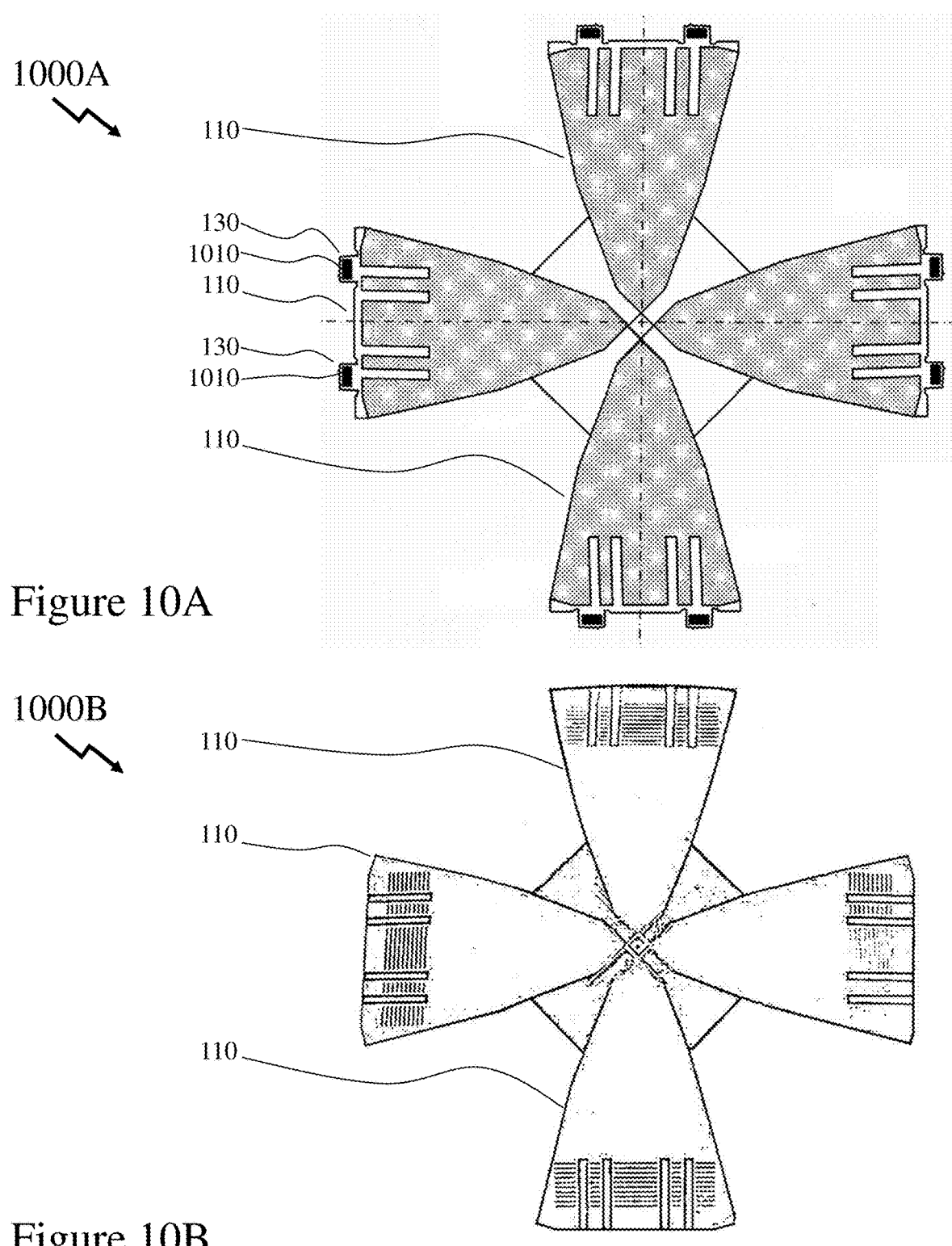
FIGS. 10A and 10B depict a plan perspective schematic and photograph respectively of an array of petals for a GNSS antenna according to an embodiment of the invention employing 4 petals.
Figures 11, 12:
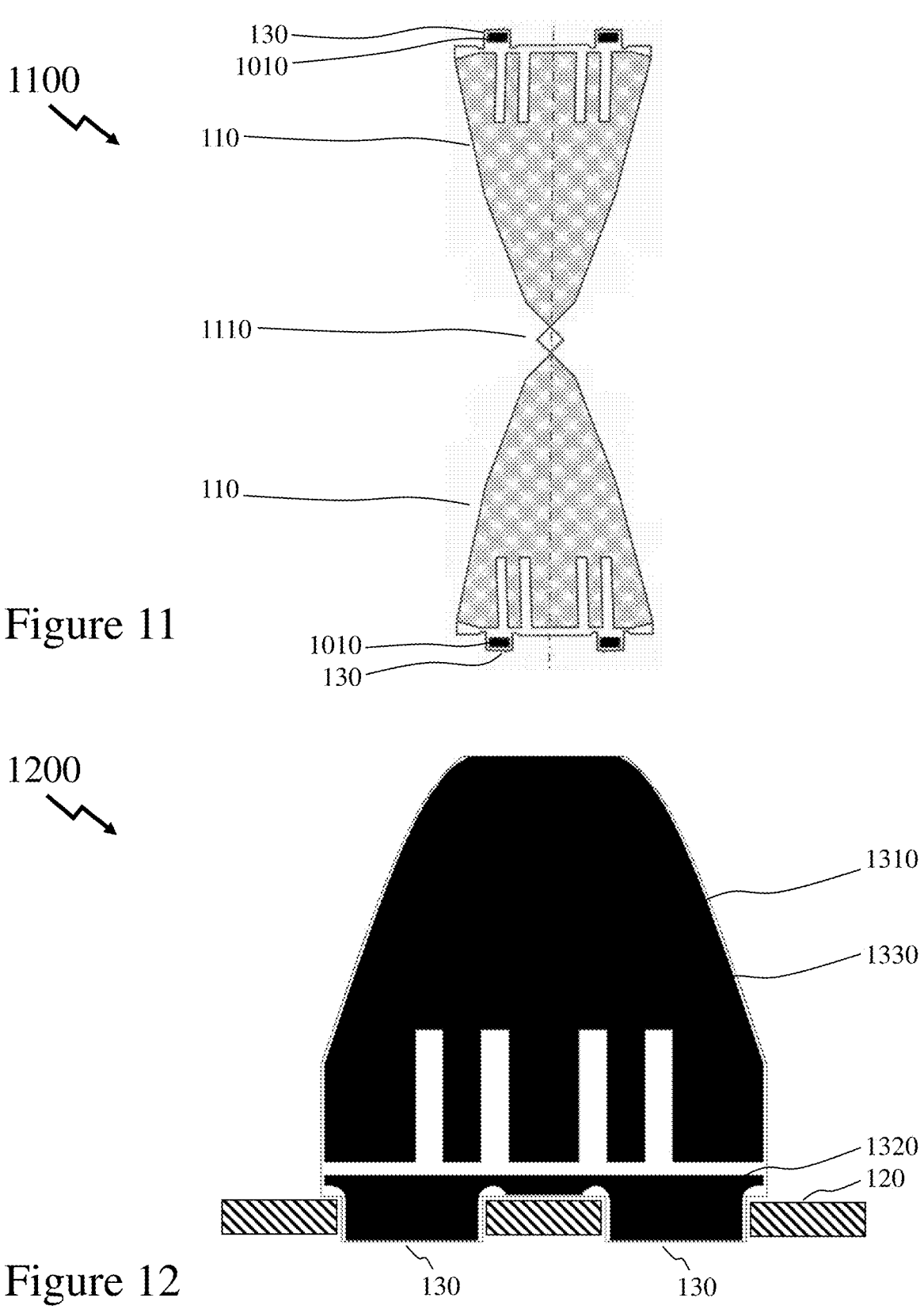
FIG. 11 depicts a plan perspective schematic of an array of petals for a GNSS antenna according to an embodiment of the invention employing a pair of petals.
FIG. 12 depicts detail for a petal with its tabs for use within a GNSS antenna according to an embodiment of the invention.

Now referring to FIGS. 10A and 10B there are depicted a plan perspective schematic 1000A and photograph 1000B respectively of an array of petals for a GNSS antenna according to an embodiment of the invention employing 4 petals. Within schematic 1000A the Petals 110 are evident together with Tabs 130. Within schematic 1000A the metallization is depicted as shaded regions forming the Petals 110 and accordingly it is evident that there is no overall pattern of metallization on the Tabs 130 but rather discrete Solder Pads 1010. Photograph 1000B depicts a 4 Petal 110 array where there are no tabs at the distal ends of the Petals 110 from the center of the array.

Referring to FIG. 11 there is depicted a plan perspective schematic of a pair of petals for an antenna according to an embodiment of the invention employing a pair of Petals 110 where in common with schematic 1000A each Petal 110 has a pair of Tabs 130 with Solder Pads 1010 disposed at its distal end. The pair of Petals 110 depicted in FIG. 11 being, for example, the pair of petals depicted in the cross-sectional view 1300A in FIG. 13 as described above which are coupled to a single dipole.

Now referring to FIG. 12 there is depicted a schematic 1200 for an alternate configuration of a Petal 1310 and Tab 130 for use within a GNSS antenna according to an embodiment of the invention. Accordingly, as depicted the Tabs 130 are metallized with first Metallization 1320 bur rather than discrete metallization per tab the first Metallization 1320 is now continuous across the distal end of the Petal 1310. However, this first Metallization 1320 is electrically isolated from the second Metallization 1330 which provides the petal in conjunction with the carrier 1310 upon which the first and second Metallizations 1320 and 1330 are formed. Further, as depicted the Tabs 130 project through openings within the PCB 120 wherein the first Metallization 1320 would be connected to the ground plane of the PCB 120.

Within the embodiments of the invention of FIGS. 1A to 13 the Petals 110 have been primarily described and depicted as being upon a carrier/substrate (hereinafter referenced to as a former) where the Petals 110 are evenly distributed around the periphery of the former. This former is depicted as forming essentially a truncated hemispherical surface. Within other embodiments of the invention the former may be designed and formed to provide different physical geometries such as a frusto-conical surface and the Petals 110 are distributed around this frusto-conical surface. Within other embodiments of the invention the former may be designed and formed to provide the Petals 110 evenly distributed around the periphery of a polygonal surface and form the antennas across this polygonal surface. Such a polygonal surface may have 4, 5, 6, 7, 8, etc. sides or other numbers although typically more sides yield lower angular transitions and hence induced stress and/or fatigue.

Embodiments of the invention described and depicted in respect of FIGS. 1A-15 employ a PCB 120. The PCB may be fabricated on a low loss substrate such as a glass-reinforced epoxy laminate material, glass ceramic composite laminate or a ceramic composite laminate for example. The PCB substrate selecting providing the requisite performance of the microwave/RF elements and circuits of the Electronics 140 and tracks coupling to Dipole A 220 and Dipole B 230. The GNSS antenna frequencies may provide constraints on the PCB size. Within an embodiment of the invention the PCB 120 is circular in shape and approximately 110 mm in diameter with one or more metallized layers. Features such as ground vias and mounting holes, such as for the Tabs 130 for example, may be formed in the PCB 120. Also disposed within the PCB 120 are mounting holes 160 or mounting slots for mounting the GNSS antenna to a choke ring, antenna support, etc. Accordingly, the reflective ground plane The ground plane of the GNSS antenna within embodiments PCB 120 may be fabricated within a two or more layer PCB 120 with the surface proximate to the installed antenna structure fully covered with metallization to provide a reflective microwave surface for the dipoles and petals disposed above. This metallization acts as a reflective ground plane as commonly used in GNSS antennas and provides the ability to increase the radiated gain "above" the antenna element, simultaneously reducing the radiated gain "below" the ground plane.

Within the embodiments of the invention described and depicted in respect of FIGS. 1A to 13 for which results are presented in Section 4 each Petal was formed by patterned metallization upon a semi-flexible substrate, such as a glass-reinforced epoxy laminate material, glass ceramic composite laminate or a ceramic composite laminate for example which is thin, for example less than 0.2 mm thick (0.008"). Each metallized Petal 110 being a two dimensional shape with a wider, outer end and a central, narrower end with a central axis longer than the wider end, with progressively decreasing width between the wider end and the narrow end. A pair of Petals 110 within each opposed pair is comprised of a first Petal 110 and a second Petal 110, co-linear with the first Petal 110, and of identical dimensions, with the proximate ends of first and second Petals 110 being the narrower ends with the midpoint between first and second Petals 110, mirrored around an axis, on the extended common axis defined as the geometric antenna center.

Within embodiments of the invention a plurality of metallized petal pairs are located such that the midpoint of each petal pair is located at the antenna center, with a relative rotation angle between adjacent for petal pairs equal for all petal pairs and equal to 360 degrees divided by 2N, where N is the number metallized petal pairs in the implementation. The smallest number of metallized pairs is 1 for a linear antenna, and 2 for a circularly polarized antenna, whilst the largest is limited by practical considerations. Within the embodiments presented above N=2 or 4.

Within embodiments of the invention described and depicted in FIGS. 1A to 13 for which results are presented in Section 4 each Petal is formed via the upper edges of Dipole A 220 and Dipole B 230 to a surface defining a substantially hemispherical shape. The upper surfaces of the first to fourth Supports 210A to 210D respectively defining a similar surface to that of Dipole A 220 and Dipole B 230. However, it would be evident that within other embodiments of the invention the surface defined by these surfaces to be a different shape although the performance of the GNSS antenna may be different.

Within the embodiments of the invention described and depicted above the mechanical assembly provides for the pair of orthogonal dipoles to not only be orthogonally disposed relative to one another but for these to be disposed perpendicular to the plane of the PCB. Accordingly, if we consider Dipole A 220 as being aligned to an X-axis then it is positioned in the X-Z plane and Dipole B 230 is aligned/position with respect to the Y-Z plane.

Within embodiments of the invention described and depicted in respect of FIGS. 1A-7B each Petal 110 has Tabs 130 at its distal end from the centre of the antenna. These being metallized in the embodiment of the invention described and depicted such that in the assembled GNSS antenna the semi-flexible PCB is installed onto the dipole structure and the ground plane of PCB 120 by means of this metallization. As depicted in FIG. 12 the metallized tabs are connected to a thin metallized track parallel to the wider edge of the metallized petal on the semiflexible PCB 700. This thin metallized track being electrically isolated from the metallized petal by a narrow unmetallized spacing.

The separation of the petal and ground plane is important in several respects. Firstly, current flow associated with the RF wave transmitted or received is largely conducted along the edge of the metallized petals, thus creating a microwave slot between the ground plane and petal. Acting as a transmission line the slot guides the RF wave resulting in a current flow null at the center of the wider edge, and is effective to reduce the low frequency response. Secondly, the capacitance between the ground plane and the petal is dominated by the unmetallized gap, which has precisely defined dimensions by virtue of the precision of the PCB fabrication process allowing the capacitance to be accurately defined. Whilst other mechanical assembly methodologies may be employed for attaching/positioning the Petals 110 then these must consider this capacitance and its variation within their design and manufacturing tolerances.

Thirdly, the variation of the unmetallized gap dimensions and hence transmission line impedance provides a convenient means to tune the effective patch length at the lower frequencies for the GNSS antenna. Accordingly, the gap may be established in dependence upon a tuning to be applied to frequencies below a predetermined frequency. Fourthly, the decreased capacitance at the base of the petal (increased reactance) is effective to increase the natural frequency of the petal as a monopole, thereby increasing the frequency of any a common mode (monopole) resonance well beyond the upper receive band edge. Finally, the unmetallized gap is effective at least in part to reduce coupling for ground plane current onto the petals.

Within embodiments of the invention employing a semi-flexible PCB for forming all Petals 110 simultaneously through patterning of a metallization layer of the PCB then the outside dimensions of the semi-flexible PCB may be larger than the circle of slots within which the Tabs 130 are assembled so that the semi-flexible PCB, when assembled over the two dipoles (Dipole A 220 and Dipole B 230) and secured to the ground plane of PCB 120 conforms to the shape of the upper surface of the two dipole PCBs. As such these may define a hemispherical dome. Accordingly, when assembled, each of the metallized Petals 110 curves upwards from their wider end, secured to the ground plane of PCB 120, towards their narrow end, at a point above the antenna center at a height pre-determined by the structure dimensions of the GNSS antenna components.

The semi-flexible substrate PCB of a dual metallized petal pair is designed with a central region concentric with the antenna center. In the case of two metallized petal pairs, the central region may be an octagonal shape dimensioned as a regular octagon with approximately across the flats. This central region may be dimensioned to match that of a stiffener, e.g. Support Frame 310. Within embodiments of the invention employing 4 Petals 110 the first to fourth Supports 210A to 210D may be optionally removed, especially if the semi-flexible PCB is only present where the Petals 110 are implemented. Where four metallized petal pairs are employed such as within the embodiment depicted in FIGS. 1A-9 then the first to fourth Supports 210A to 210D respectively ensure that the Petals 110 disposed between Petals 110 associated with the pair of dipoles have the same surface profile.

Within embodiments of the invention, such as those depicted in FIGS. 1A-2B, 7A-7B, and 7D-10 the metallization of the Petals 110 is pattern with slots which within the assembled GNSS antenna are vertical to the ground plane of the GNSS antenna. These provide two benefits:

in conjunction with the transmission line comprised of the unmetallized gap between the metallized petal and the ground plane, the slots are inductive, acting as shorted stubs, and are thus effective to slow the wave front down so as to further reduce the low end of the frequency response; and the increased impedance at the wider end of the petal is effective to reduce the coupling between the metallized petals and the ground plane.

Section 3: Operating Principles of Dipole Fed Antenna Elements and Systems

As noted in Section 1 the design goal of the inventors was a precision GNSS antenna with a broad bandwidth, a good AR, and a very tight phase centre variation with improved performance for the reception of signals from satellites at low elevation angles. This being particularly necessary for reception of L-band correction signals which can be expected to be incident at elevation angles of 10 degrees to 50 degrees above the horizon.

Central to the design approach established by the inventors was the elimination of feed currents within the ground plane of the antenna, e.g. the ground plane in PCB 120. This ground plane reflecting the signals emitted towards it so that relative to an antenna without the ground plane higher gain is achieved elevations above the ground plane. As another objective in most antennae is minimum footprint then the diameter of the ground plane (as it is usually circular) is typically close to $\lambda/2$ at the operating frequency of the GNSS antenna. Accordingly, the ground plane can easily couple to other antenna elements resulting in performance degradations. Hence, a design approach that eliminates any currents flowing in the ground plane reduces such coupling effects and performance degradations.

Within the prior art the Dorne-Margolin (DM) antenna has been employed for decades in GPS reference stations (usually employed within a choke ring antennas). The DM antenna exhibits a higher gain at low elevation angles (about −3 dBic at horizon) than that of other GNSS antennas commercially available (typically −5 dBic or less), and a fairly good phase-center stability in a compact design. The DM antenna structure consists of two orthogonal pairs of short dipoles above a ground plane, with the feeds at the midpoint of the dipoles, as shown in first image 1400A in FIG. 14A. As depicted there is first Dipole 1410 with its feed 1415 and second Dipole 1420 with its associated feed 1425. These being disposed above the ground plane 1430.

Accordingly, referring to second image 1400B in FIG. 14B the antenna can be considered in terms of a ground plane image, replacing the ground plane 1430 with the images of the dipoles. Accordingly, third dipole 1440 represents the image of first dipole 1410A and fourth dipole 1450 the image of second dipole 1420. Accordingly, when the first and second dipoles 1410 and 1420 are driven the resulting antenna structure acts as a large uniform current circular loop, similar in structure to that of an Alford Loop antenna. However, the DM antenna exhibits drawbacks in that the feed network is complex and lossy with costly fabrication, which affects repeatability and reliability. Further, the AR at zenith is marginal (up to 1.5 dB) and further degrades to 7 dB at the horizon, a factor that become less relevant in a choke ring configuration where the DM antenna is the most commonly used.

Accordingly, the inventors after significant research and development established the design methodology outlined in Section 2 and as depicted in first image 1500 in FIG. 15A for the GNSS antenna according to an embodiment of the invention. Accordingly, the GNSS antenna consists of bowtie radiator elements (the petals) which are disposed over a circular ground plane. The petals are coupled to a distributed feed network comprising the pair of low loss crossed dipoles located between the petals and the ground plane, namely Dipole A 220 and Dipole B 230 as described and depicted in FIGS. 2-6B and 8 respectively. The relationship between the petals and the associated feed system provides a current maximum at the curvature of the petals instead of at the center of the antenna. This is evident in the simulation results depicted in FIG. 15 where the current maximum is towards the middle of each edge of each petal. Accordingly, the resulting current distribution is similar to that within a DM antenna element. This increases the gain at low elevation angles which greatly improves the link margin for low elevation GNSS and L-band satellites.

The inventors have established that the circular polarization of the antenna at low elevation angles can be significantly improved by optimizing the petal's dimensions such as its height, width, and its angle with respect to the ground plane. These geometric adjustments can address the problem of asymmetry between the E and H planes of the antenna radiation pattern, which usually degrades the AR at low elevation angles. Based upon the simulations the inventors established that the bowtie geometry of the radiators (petals), as well as their coupling to the feeding network, can improve both the impedance and AR bandwidth of the GNSS antenna. In this manner the inventors have established a wideband, low loss antenna covering the entire GNSS frequencies from 1150 MHz to 1610 MHz. Exemplary performance, for which more details are presented in Section 4, being that the matching loss to the feeding network is below 0.3 dB, the AR remains around 0.5 dB at zenith and the AR is typically below 3 dB at horizon over the whole GNSS frequency range.

Referring to FIGS. 9-10B the GNSS antenna has 4 petals whilst in FIGS. 1A-2B, 7A-9 and 15A there are 8 petals. During developments of the GNSS antenna the inventors established that increasing the number of petals resulting in improvements in symmetry, but at the cost of complexity. Accordingly, the exemplary embodiments of the invention depicted in FIGS. 9-10B employ the minimum 4 whilst those within FIGS. 1A-2B, 7A-9 and 15A exploit 8 as this was established as a balance between the improved symmetry relative to 4 petals and feed complexity.

As noted above and below the GNSS antenna according to embodiments of the invention receives/radiates RF signals by means of electromagnetic radiation resulting from currents induced/driven into diametrically opposed "petals pairs" disposed in a piecewise linear approximation to a curved 3-dimensional structure above a metal ground plane. The received/radiated signals from the GNSS antenna being coupled from/to a petal pair by a dipole coupled to the microwave/RF feed network.

A GNSS antenna according to embodiments of the invention employs a pair of such dipoles which are disposed orthogonal to one another and have high electromagnetic isolation from one to the other. If signals of the same frequency but having a 90 degree phase difference ("phase quadrature") are imposed upon the orthogonal, electrically isolated antennas, the resulting radiation is circular because the two signals can be considered unrelated except to say that the resultant radiated signal is the vector sum of the radiating electric vectors is a vector rotating in space.

Each single opposed petal pair structure exhibits two operational modes in the frequency band of interest. The first mode, a wanted mode, is one in which the currents in each of the opposed petals flow in phase, Consequentially, the voltages developed across each of the petals are also in phase, so that at the at the extremities of the petal pair the voltages are antipodal, with a maximum electromagnetic field generated between the narrow ends at the antenna center which arises due to the low impedance at the wider end of the petals resulting from the image/capacitance adjacent to the ground plane. With currents flowing in the same direction in each petal, a magnetic field is created, or alternatively, currents are induced in each petal, in the same direction, in response to a magnetic field orthogonal to the plane of the opposed petal pair and the resultant wave is reflected in phase by the ground plane.

The second move, an unwanted mode, is a form of cavity or monopole resonance, wherein the entire cavity or collection of monopoles, exhibits a lambda/4 resonance. In this mode, the voltages produced at the "top" of the monopoles are in phase and accordingly there is no potential difference between the narrower ends of the petals at the center. Within this specification specific consideration of this resonant mode is not addressed as the frequency of this resonant mode can be moved to a higher frequency outside of the band of interest by parametric adjustments to the GNSS antenna.

Referencing back to FIG. 14B each opposed petal pair may be viewed as operating as one half of a structure known as the Alford Loop in that in the first mode the currents in each of the opposed petals flow in phase (as do the currents within the pair of dipoles comprising first Dipole 1410 and second Dipole 1420 in FIG. 14B). Accordingly, in conjunction with the ground plane and the mirror images of these currents flowing an effective Alfred Loop is established.

Now considering a GNSS antenna according to an embodiment of the invention with orthogonal first and a second opposed petal pairs then a plane wave incident on the GNSS antenna at the horizon, such that the Poynting vector is aligned with the axis of the first opposed petal pair (e.g. an electromagnetic field aligned with a vertical E field and horizontal H field) will induce a current in the first opposed petal pair (orthogonal to the H field), and an EM wave aligned with a horizontal E field and vertical H field will be generate an electromagnetic field in the second opposed petal pair (parallel to the E field). This structure is favorable for low axial ratio by virtue of potentially balanced signals induced/generated in orthogonal opposed petal pairs by orthogonal fields.

Within the prior art the simplest way to couple a feed circuit to the opposed petal pairs is by direct electrical contact to each petal. However, the directly connected feed impedance of each metallized petal varies from a low value close to the wider end of the petal, located close to the edge of the ground plane, to a very high value at the narrow end of the petal near to the antenna center. The feed impedance at the wider end of the petals is low, similar to that of a monopole (around 25 Ohms), then further reduced by currents arising from the reflected image of the curved monopole over the ground plane. However, this impedance can be matched so that a directly connected feed to the wider end of each petal is electrically and mechanically convenient.

However, with the feed connections close to the edge of the ground plane, the feed return currents are also directly injected into the ground plane. At the wanted frequency, the ground plane is close to lambda/2 in diameter, and driven currents flowing in the ground plane cause the ground plane itself to radiate, which very significantly interferes with and degrades the wanted radiation characteristics. Measurements and simulations performed by the inventors confirmed that the ground return currents associated with the "monopole" style petal feeds result in poor axial ratios, particularly at low elevation angles.

Alternatively, a direct connection at the center of the structure, namely each petal is fed at the narrower end, is characterized by a high impedances, which is difficult to match.

The inventive GNSS antenna according to embodiments of the invention avoids these difficulties associated with direct electrical connections of feed circuits by using the pair of dipoles (narrow band dipoles) which form X-Y axes around a centre point of the ground plane, e.g. formed as part of the PCB 120 or alternatively separate to it. The pair of dipoles, namely Dipole A 220 and Dipole B 230, are arranged above the ground plane of the PCB and are coupled to the feed circuit. Above the pair of orthogonally disposed dipoles are a plurality of petal pairs arranged such that the pair of dipoles are aligned along a centre line of each a petal pair of the plurality of petal pairs. The plurality of petal pairs is arrayed circularly around a z-axis orthogonal to a plane formed by the ground plane. The z-axis passes through the centre of the ground plane. The plurality of petal pairs is disposed such that the mid-point of each petal pair, namely the midpoint between the metallized petals, is precisely located at the antenna centre at the crossing point of the pair of dipoles. An outer end of each of the plurality of petal pairs is secured, for example to an outer circumference of the ground plane.

Accordingly, a GNSS antenna according to embodiments comprises a number of components:

a substantially circular ground plane PCB, employed as a reflective ground plane;
   a pair of dipoles mounted vertically with respect to the ground plane;
   a plurality of pairs of petals disposed above the pair of dipoles and the ground plane;
   a feed network comprised of a hybrid and two baluns to generate antipodal signal pairs in phase quadrature.

The plurality of pairs of petals are disposed as a substantially hemispherical, domed array of opposed metallized petal pairs. These may be mounted to the ground plane in proximity to the outer circumference of the ground plane. The distributed feed network couples the opposed metallized petal pairs to an electrical circuit and provides the progressive relative phase shifts to enable operation of the GNSS antenna upon circular polarization.

Accordingly, the inventors have established an innovative wideband antenna structure comprising a narrow band dipole coupled electromagnetically to a symmetrical arrangement of metallized petals which are arranged centrally over a distal metallized ground plane, with symmetrical antipodal feed signals connected to the dipole feed connections at the center of the dipole, wherein the innovative wideband antenna structure provides a wideband return loss and impedance at the dipole feed connections. This performance comparable to that of the narrow band return loss of the dipole alone wherein the metallized petals provide a wideband loss matching feed network to increase the radiative efficiency of the combined structure.

Accordingly, the inventors have established an innovative wideband antenna structure comprising a dipole coupled electromagnetically to a symmetrical arrangement of metallized petals, arranged centrally over a distal metallized ground plane, with symmetrical antipodal feed signals connected to the dipole feed connections at the center of the dipole which are further connected to feed connections confined toward the center of the ground plane, whereby local current maxima in the antenna radiating elements are offset from the dipole center, and a ground plane remains essentially devoid of dipole feed return currents where the dipole and symmetrical arrangement of metallized petals are disposed above the ground plane.

Accordingly, the inventors have established an innovative wideband antenna structure comprising a narrow band dipole coupled electromagnetically to a symmetrical arrangement of metallized petals, arranged centrally over a distal metallized ground plane, with symmetrical antipodal feed signals connected to the dipole feed connections at the center of the dipole, wherein local current maxima in the antenna radiating elements are offset from the dipole center and an inflexion in the magnitude of the current in the combined radiating elements comprising the dipole and symmetrical arrangement of metallized petals occurs at the center of the dipole.

Accordingly, the inventors have established an innovative wideband antenna structure comprising a narrow band dipole coupled electromagnetically to a symmetrical arrangement of metallized petals, arranged centrally over a distal metallized ground plane, with symmetrical antipodal feed signals connected to the dipole feed connections at the center of the dipole, wherein the symmetrical metallized petals extend the bandwidth of the antenna structure to larger than that of the narrow band dipole alone.

Section 4: Performance of a Dipole Fed Antenna Element and System

The inventors have described above the antenna requirements, construction concepts and design principles in Section 1 to 3 respectively. Accordingly, in this section results for a GNSS antenna according to an exemplary embodiment of the invention are presented. The GNSS antenna being as depicted in first image 1500 in FIG. 15A.

4.1 Radiation Patterns and Roll-Off

Figure 16:
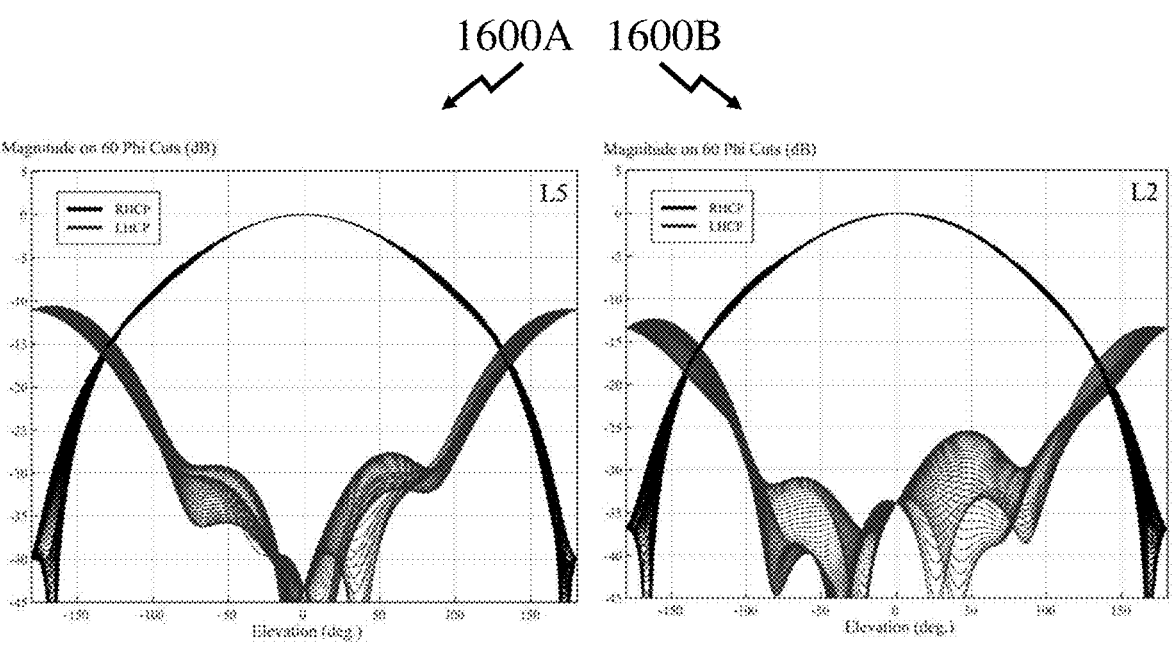
FIGS. 16 and 17 depict the antenna response for right and left hand circular polarisations versus elevation for a GNSS antenna according to an embodiment of the invention at the GPS L5, GPS L2, Galileo E6 and GPS L1 frequencies respectively showing constant amplitude response to signals coming at a specific elevation angle regardless of the azimuth angle.
Figure 17:
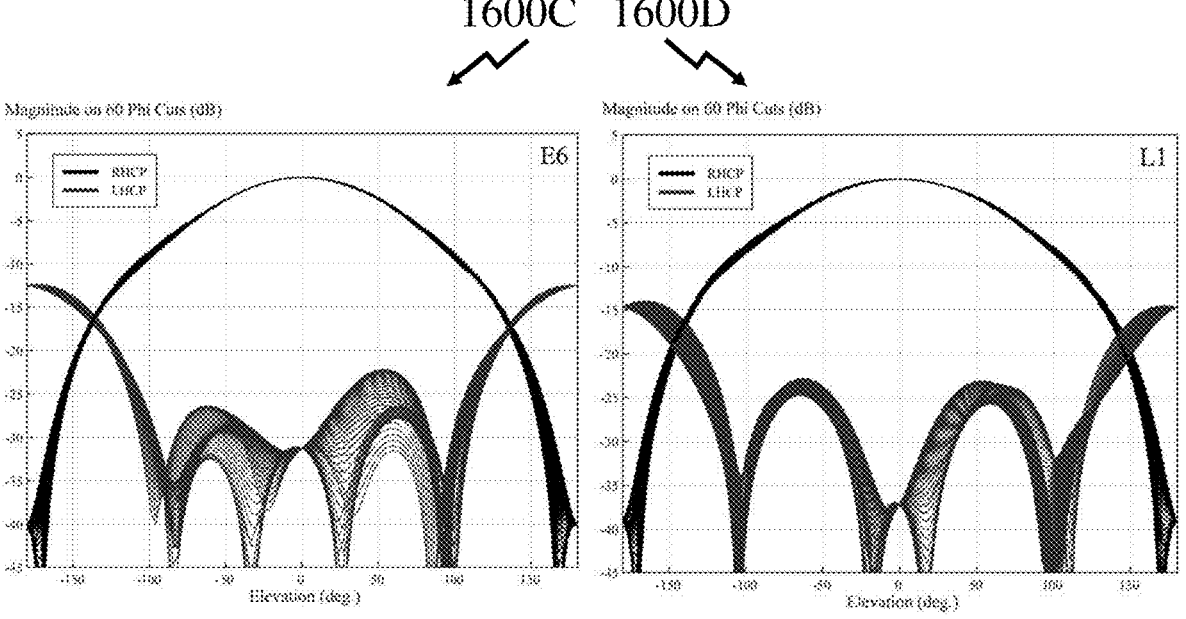

The measured radiation patterns for the exemplary GNSS antenna are presented in FIGS. 16 and 17 at four different GPS frequencies. These being:

First graph 1600A in FIG. 16 for the GPS L5 (1.164-1.189 GHz);
   Second graph 1600B in FIG. 16 for the GPS L2 (1.215-1.2396 GHz);
   Third graph 1600C in FIG. 17 for the Galileo E6 (1.260-1.300 GHz); and
   Fourth graph 1600D in FIG. 17 for the GPS L1 (1.563-1.587 GHz).

In each of FIGS. 16 and 17 the radiation patterns are normalized, showing the RHCP and LHCP gains on sixty azimuth cuts three degrees apart. It can be seen LHCP signals are significantly suppressed in the upper hemisphere at all GNSS frequencies. The difference between the RHCP gain and the LHCP gain ranges from 31 dB to 43 dB, which ensures an excellent discrimination between the signals. Furthermore, for other upper hemisphere elevation angles, the LHCP signals stay 22 dB below the maximum RHCP gain and even 28 dB from 1200 MHz to 1580 MHz. As will be evident from the results presented below this constant amplitude response to signals coming at a specific elevation angle regardless of the azimuth angle results in improved phase center variation.

Figure 18:
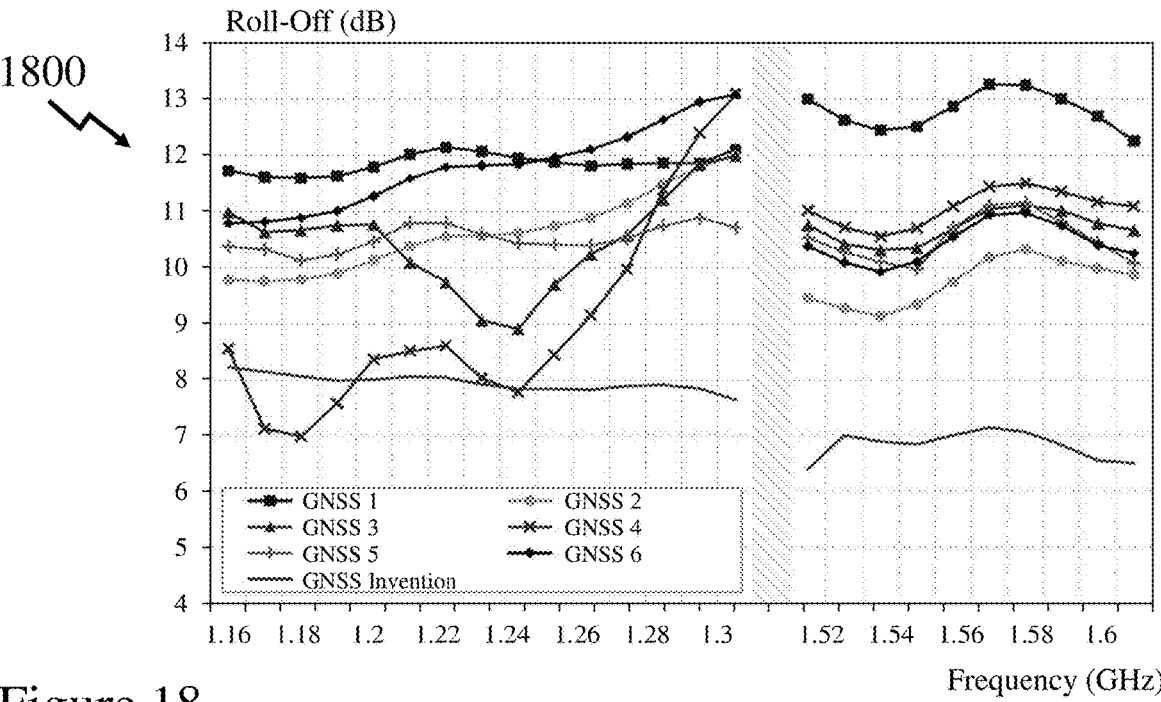
FIG. 18 depicts a comparison of a GNSS antenna according to an embodiment of the invention with commercial prior art GNSS antennas targeted to the same application.

Now referring to FIG. 18 there is depicted a comparison of a GNSS antenna according to an embodiment of the invention (GNSS Invention) with 6 commercial rover prior art GNSS antennas targeted to the same application (GNSS 1 to GNSS 6). Accordingly, it is evident that the GNSS antenna according to an embodiment of the invention has a significantly lower roll-off than the prior art antennae. As evident from FIG. 18 the amplitude roll-off for the GNSS antenna according to an embodiment of the invention from boresight (zenith) to horizon is between 6.5-8 dB for all the frequency bands.

However, high gain at low elevation angles (low roll-off) causes an antenna to be more susceptible to multipath interference. Multipath signals are mainly late LHCP and RHCP. If they arrive at high elevation angles, there is no issue as the AR of the antenna is low at those angles, thus there will be minimal reception of the multipath signals. However, in conventional antennas, low elevation angle multipath degrades observations due to the poor AR performance and low UDR. At lower elevation angles, the GNSS antenna according to an embodiment of the invention provides for improved AR performance and good UDR, which significantly reduces multipath interference. Accordingly, the inventors also performed measurements in a high multipath environment for the GNSS antenna according to an embodiment of the invention and the 6 commercial rover prior art GNSS antennae. The GNSS antenna according to an embodiment of the invention yielded a phase noise at 5° degrees elevation angle of approximately 6 mm to 10 mm over all GNSS frequencies. Whilst the other prior art GNSS antennae performed similarly they have higher roll-off and hence lower gain at the horizon. Accordingly, the GNSS antenna according to an embodiment of the invention provides stronger signals at low elevation angles and improved multipath mitigation performance relative to the prior art antennae.

Figure 19:
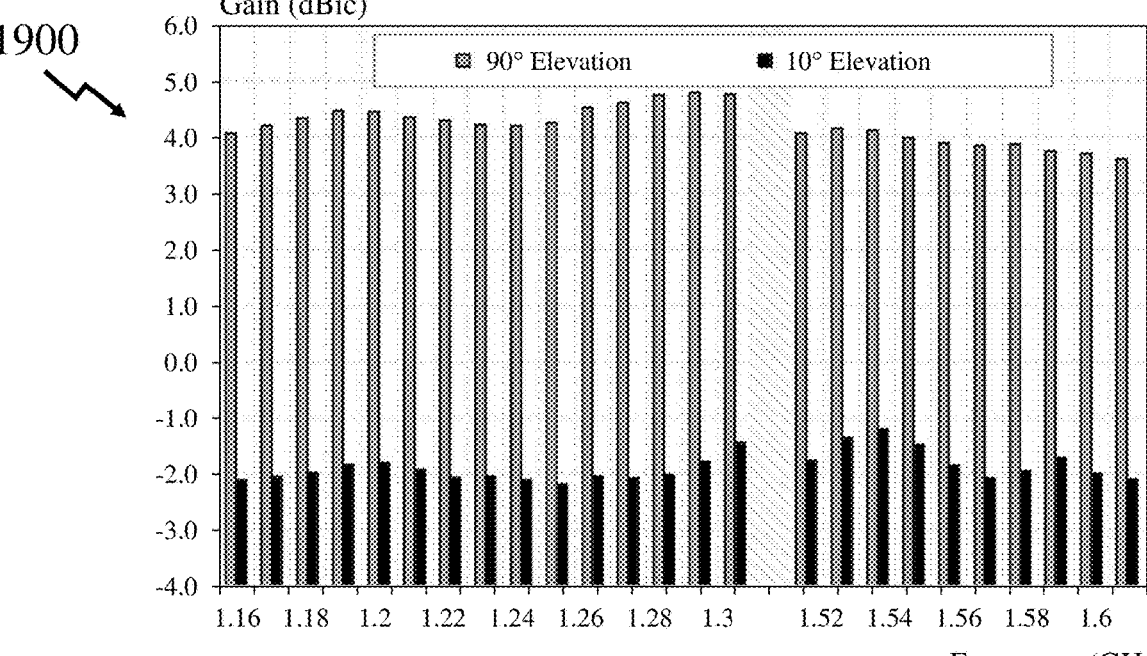
FIG. 19 depicts the right hand circular polarisation (RHCP) gain of a GNSS antenna according to an embodiment of the invention at zenith and 10° elevation for all GNSS frequencies.
Figure 20:
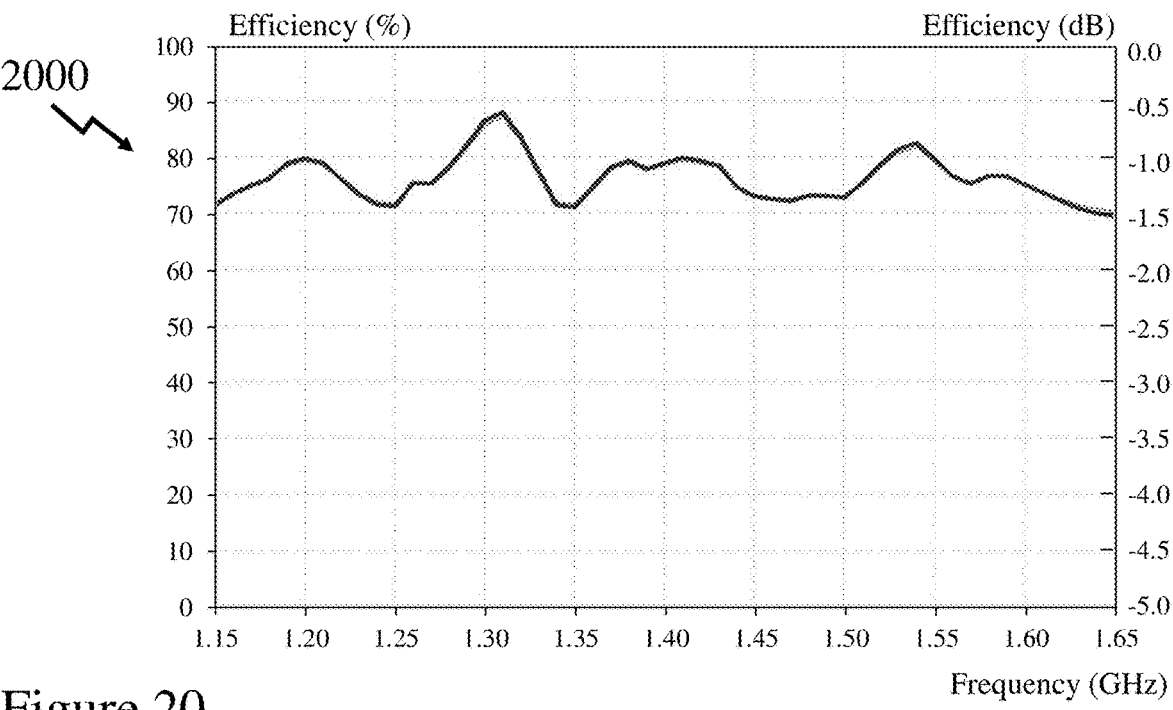
FIG. 20 depicts the radiation efficiency of a GNSS antenna according to an embodiment of the invention over all GNSS frequencies.

4.2 Antenna Gain and Efficiency:

Referring to FIG. 19 there is depicted the right hand circular polarisation (RHCP) gain of a GNSS antenna according to an embodiment of the invention at zenith and 10° elevation for all GNSS frequencies. These measurements show that the antenna exhibits a gain range at zenith from 4.1 dBic at 1160 MHz to 3.6 dBic at 1610 MHz. The antenna gain at 10° elevation angle varies from –1.45 dBic to –2.2 dBic and is maximum in the frequency range used to broadcast L-band corrections (1539 MHz to 1559 MHz). The radiation efficiency of the GNSS antenna according to an embodiment of the invention both in percentage and loss in dB is depicted in FIG. 20 from which it is evident that the radiation efficiency is between 70% and 89% over the full bandwidth.

This corresponds to an inherent ("hidden") loss of only 0.6 dB to 1.5 dB, including copper loss, feedline, matching circuit and 90-degree hybrid coupler losses. This performance is a substantial improvement over other alternate antenna element geometries such as spiral antennas which exhibit an inherent efficiency loss of close to 4 dB in the lower GNSS frequencies. With the integration of a wideband prefiltered low-noise amplifier (LNA), a G/T of –25 dB/K at 10 degrees of elevation was measured.

4.3 Axial Ratio

Figure 21:
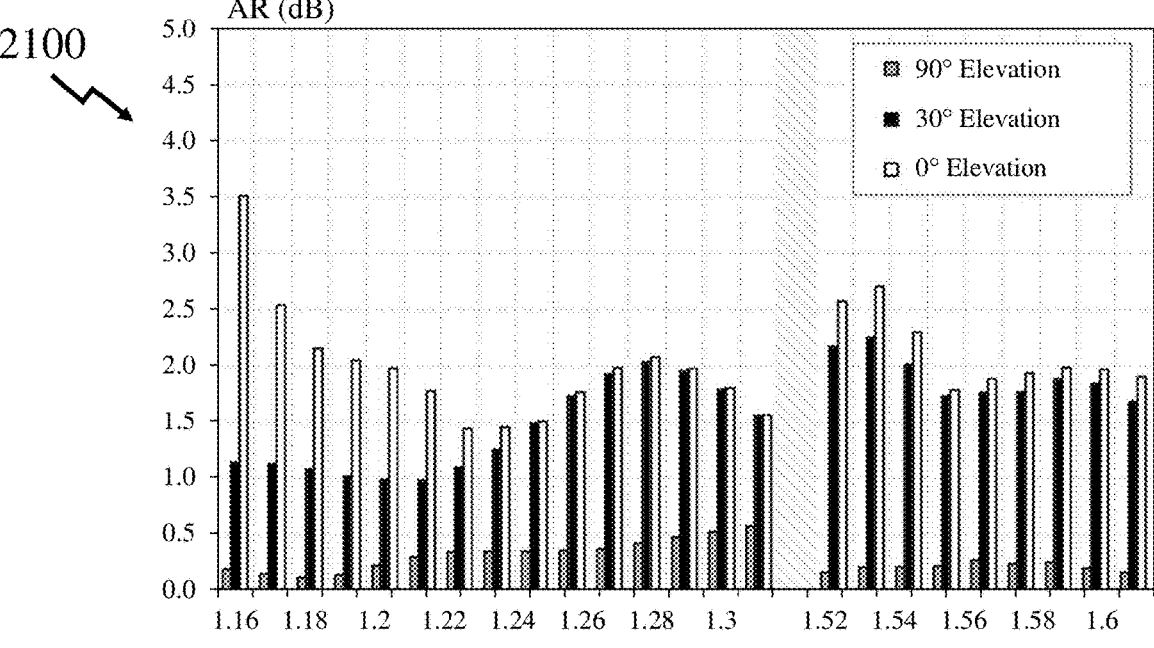
FIG. 21 depicts the axial ratio (AR) for a GNSS antenna according to an embodiment of the invention at different elevation angles.
Figure 22:
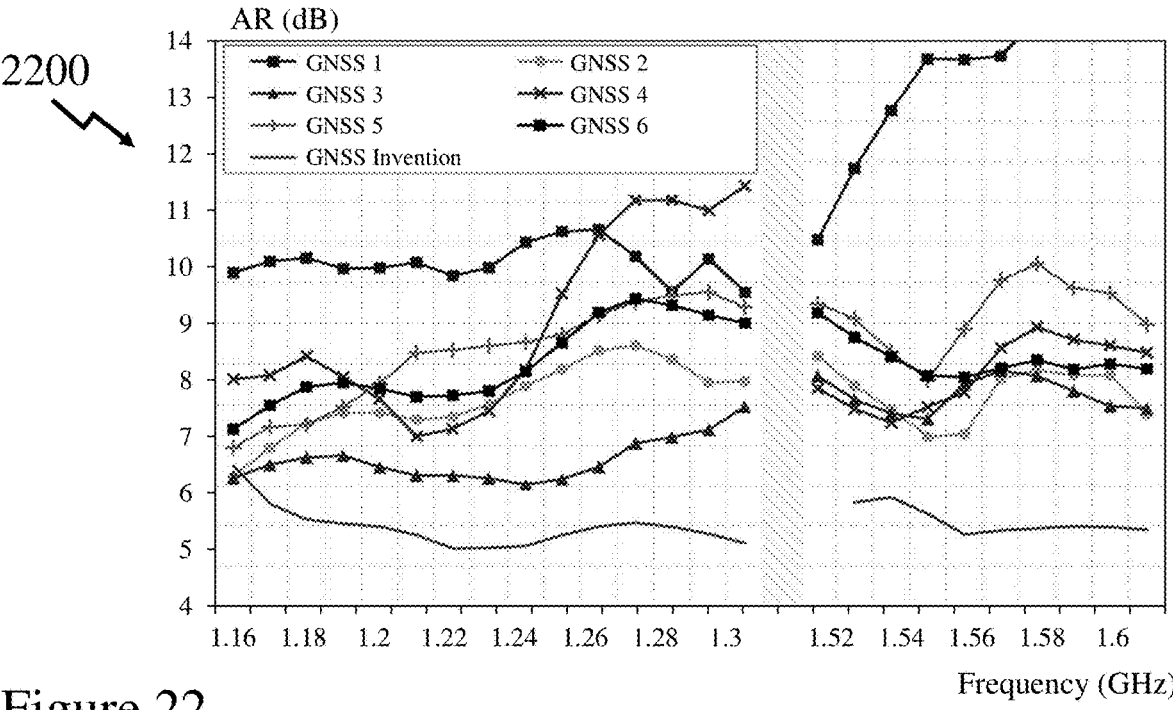
FIG. 22 depicts the AR performance of a GNSS antenna according to an embodiment of the invention at horizon compared with commercial prior art GNSS antennas targeted to the same application.

The AR values of the GNSS antenna according to an embodiment of the invention different elevation angles are shown in FIG. 21. As evident in FIG. 21 the GNSS antenna according to an embodiment of the invention has good AR performance over the all GNSS frequency bands and at all elevation angles and does not exceed 3.5 dB. It is known that a low AR increases an antenna's ability to reject the LHCP signals that are caused by the reflections from nearby objects. Accordingly, the susceptibility of a GNSS antenna according to an embodiment of the invention to multipath interference is greatly reduced. Further, referring to FIG. 22 the AR performance of the GNSS antenna according to an embodiment of the invention at horizon is compared to the 6 commercial rover GNSS prior art antennae. From these results it is evident that the GNSS antenna according to an embodiment of the invention has the lowest AR among these antennas. The lowest AR of these competitive antennas being comparable to the worst AR of the GNSS antenna according to an embodiment of the invention, but typically significantly higher AR is evident for the commercial GNSS antennae relative to the GNSS antenna according to an embodiment of the invention.

4.4 Phase Center Variation

Figure 23:
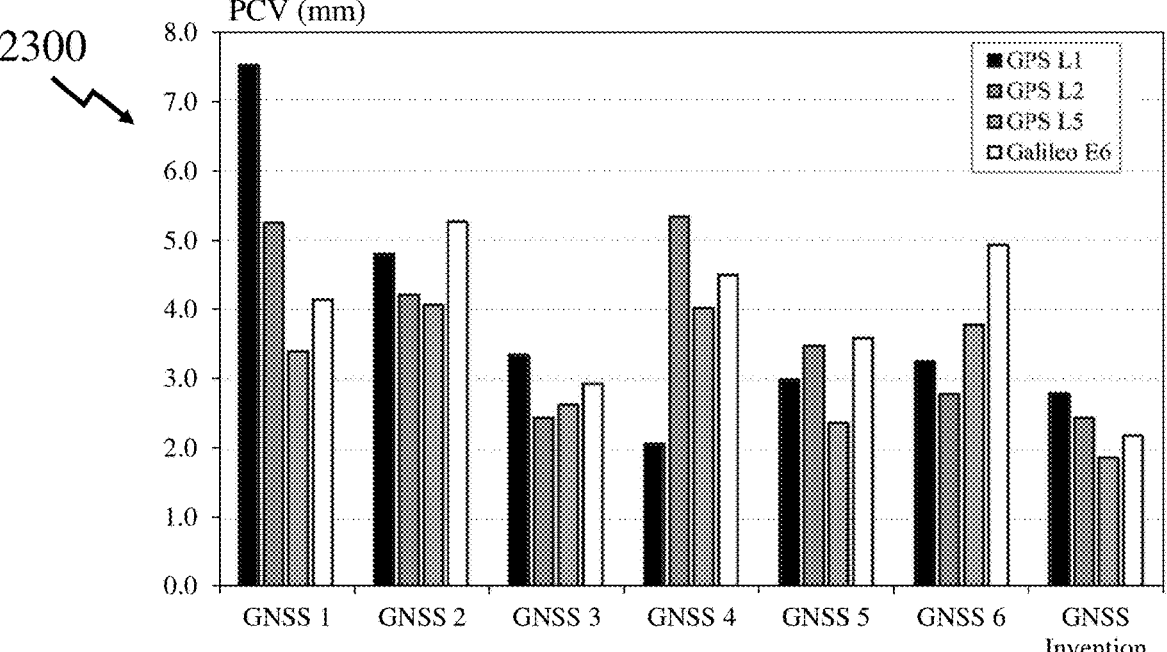
FIG. 23 depicts the phase centre variation (PCV) of a GNSS antenna according to an embodiment of the invention at horizon compared with commercial prior art GNSS antennas targeted to the same application.
Figure 24:
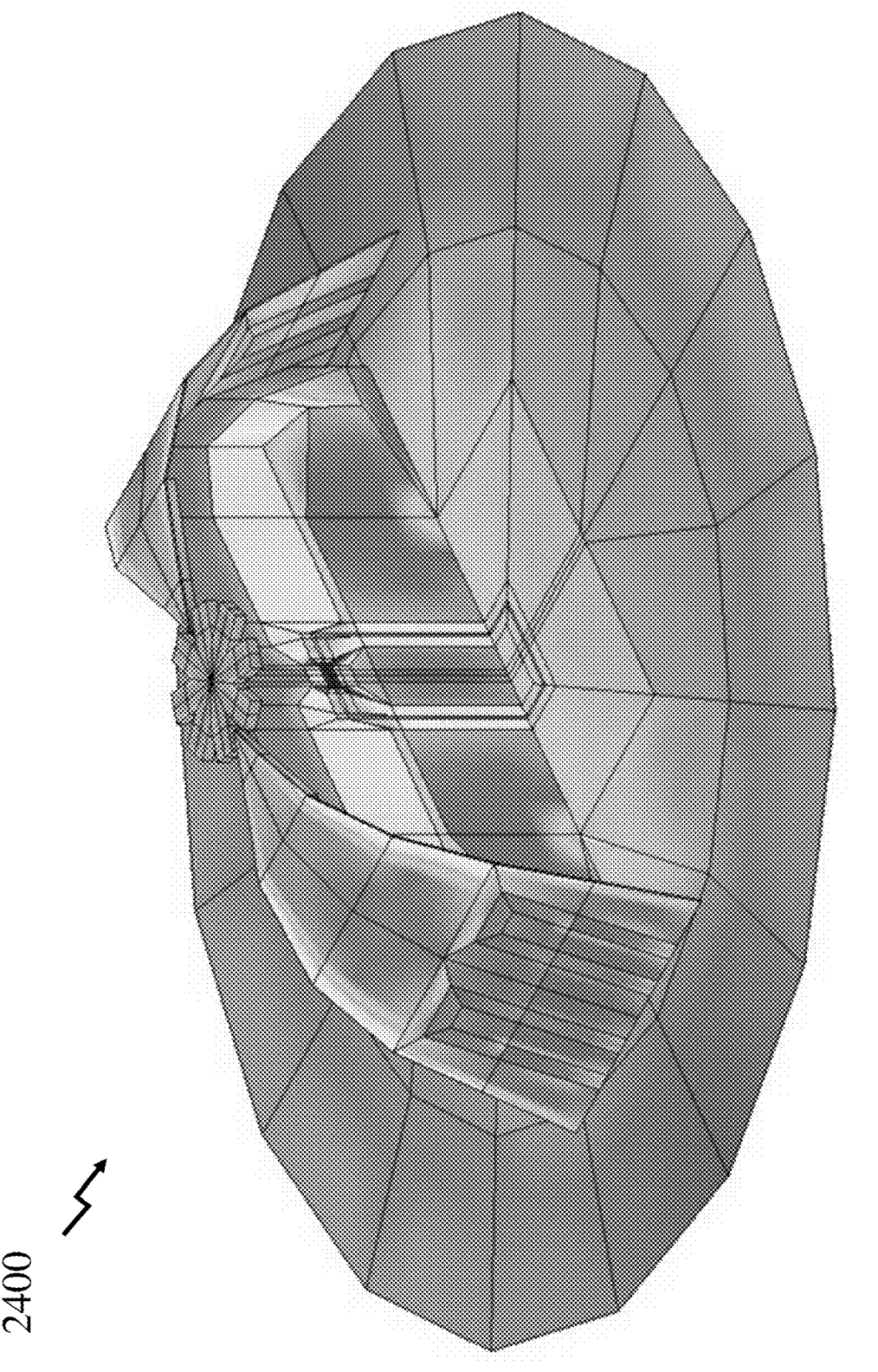
FIG. 24 depicts the results of a CAD for a GNSS antenna according to an embodiment of the invention employing a dipole element in conjunction with a pair of petals.

In order to estimate the PCV from the measured radiation pattern a MATLAB code was implemented wherein the results of this analysis are presented in FIG. 23 which depicts the maximum PCV of the GNSS antenna according to an embodiment of the invention relative to the six commercial rover antennas for four common GNSS frequencies. It is evident from FIG. 23 that the GNSS antenna according to an embodiment of the invention has a maximum total PCV of less than 2.9 mm for all frequency bands, results being depicted for GPS L1, GPS L2, GPS L5 and Galileo E6. Further, the PCV of the GNSS antenna according to an embodiment of the invention does not vary significantly with frequency.

4.4 Low Noise Amplifier Design

The best achievable carrier-to-noise ratio (CNR or C/N) for signals with marginal power flux density is limited by the efficiency of each of the antenna elements, the gain, and the overall receiver noise figure. This can be quantified by the ratio parameter, G/T, which is typically dominated by the noise figure of the input LNA within the receiver microwave/RF electronics. Within an exemplary LNA amplifier design according to an embodiment of the invention the received signal from the GNSS antenna according to an embodiment of the invention is split by a diplexer directly connected to the antenna terminals into two bands, one comprising the lower GNSS frequencies (from 1160 MHz to 1300 MHz) and the other the higher GNSS frequencies (from 1610 MHz to 1610 MHz). Each band is then prefiltered. Accordingly, it would be evident to one of skill in the art that this is where the high gain and high efficiency of the GNSS antenna according to an embodiment of the invention provides an inherent advantage, since the unavoidable losses introduced by the diplexer and filters are offset by the higher antenna gain, thus preserving the G/T ratio.

However, it is also evident that GNSS receivers must accommodate a crowded RF spectrum, and there are a number of high-level, potentially interfering signals that can saturate and desensitize GNSS receivers. These include, for example, the Industrial Scientific and Medical (ISM) band signals and mobile phone signals, particularly Long-Term Evolution (LTE) signals in the 700-MHz band, which are a hazard because of the potential for harmonic generation in the GNSS LNA. Other potential interfering signals include Globalstar (1610 MHz to 1618.25 MHz), Iridium (1616 MHz to 1626 MHz) and Inmarsat (1626 MHz to 1660.5 MHz) which are high-power uplink signals and particularly close in frequency to GLONASS signals. Accordingly, the LNA implemented by the inventors for use with the GNSS antenna according to an embodiment of the invention is a compromise between ultimate sensitivity and ultimate interference rejection.

Accordingly, the inventors employ defensive measures within the LNA for use in conjunction with the GNSS antenna according to an embodiment of the invention. A first defense is the addition of multi-element bandpass filters at the antenna element terminals (ahead of the LNA). These have a typical insertion loss of 1 dB because of their tight passband and steep rejection characteristics but the LNA noise figure is increased approximately by the additional filter-insertion loss. The second defensive measure is to employ a high linearity LNA which is achieved without any significant increase in LNA power consumption, using LNA chips that employ negative feedback to provide well controlled impedance and gain over a very wide bandwidth.

It is important to consider that whilst an antenna installation might initially be determined to have no interference, the subsequent introduction of new telecommunication services may change this, so interference defense is prudent even in a quiet radio frequency environment. A potentially undesirable side effect of tight pre-filters is the possible dispersion that can result from variable group delay across the filter passband. Thus, it is important to include these criteria in selection of suitable pre-filters. The filters in the LNA established by the inventors yields a maximum variation of less than 10 nanoseconds in group delay over the lower GNSS frequencies (from 1160 MHz to 1300 MHz) and over the higher GNSS frequencies (from 1539 MHz to 1610 MHz) respectively. The inventors have established two variants of the LNA, one with 28 dB gain LNA which is embedded within the Electronics 140 of microwave/RF circuit of the GNSS antenna and a second with 37 dB LNA intended for use in installations with long coaxial cable runs. The microwave/RF circuit within the Electronics 140 of the GNSS Antenna is internally regulated to allow a supply voltage from 3 V to 16 V.

Specific details are given in the above description to provide a thorough understanding of the embodiments of the invention. However, it is understood that the embodiments may be practiced without these specific details.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A wideband circularly polarized antenna comprising:
a ground plane substrate with at least two metal layers, with the upper metal layer continuously metallised to comprise a ground plane surface, and with a first central mounting slot and a second central mounting slot disposed co-centric with and orthogonal to said first central mounting slot, and a plurality of peripheral mounting slots,
a first and a second dipole substrate of equal outer dimensions, equally patterned with a balun and a narrowband dipole imprinted in metal layers on the dipole substrate, said balun connected to metallized terminals on projecting tabs at the center of the lower edge of said dipole substrates, said first and second dipoles including interlocking slots to provide for assembly of a three dimensional crossed dipole structure,
an assembly comprised of an orthogonal dipole structure mounted on said ground plane substrate by insertion of the respective ones of the projecting tabs, into said first and second central mounting slots with first and second balun feeds connected a first and a second output of feed circuit comprised of an RF 90 degree coupler
a first and a second opposed petal pair each comprised of a first petal and a distal second petal etched in metal with a non-conductive margin, on a semi-flexible substrate each of identical dimensions, each petal with a wider end and a distal narrower end, with a central axis longer than the wider end, with progressively decreasing width between said wider end and said narrower end, said first and second petals co-linear, with the proximate ends of said first and second petals being the narrower ends, said first and second opposed petal pairs disposed with the axis of each orthogonal to the other, with the common mid-point between first and second petals on each extended axis defined as the geometric antenna center,
each of said metallized petals having a plurality of metallized attachment tabs at the wider end, electrically isolated from said metallized petals, said semi-flexible substrate of sufficient length to form a domed structure by insertion of said attachment tabs into said peripheral mounting slots in said ground plane with said petal pairs aligned along the axes of the crossed dipoles,
the upper edge of said first and second dipole substrates is sculpted identically to provide a precise space between the opposed petal pairs and said crossed narrowband dipoles whereby said dipoles are effective through electromagnetic coupling to comprise a wideband distributed feed network for a circularly polarized antenna, wherein none of said opposed petal pairs is directly connected.

2. The wideband circularly polarized antenna according to claim 1, wherein
said plurality of metallized attachment tabs associated with a single one of each of said metallized petals is electrically connected by thin conducting metallized links, each immediately adjacent to the attachment tabs, and parallel with the wider edge of the metallized petal;
said metallized links being electrically isolated from said metallized petals by means of a narrow, unmetallized opening between the metallized link and the metallized petal; and
the metallized link is electrical connected to ground and presents a predetermined capacitance to its associated metallized petal.

3. The wideband circularly polarized antenna according to claim 1, wherein
each petal of said first and said second opposed petal pairs has a plurality of unmetallized slots etched into the petal metallization, parallel to the petal axis, of a pre-determined number, length and width, on the continuous semi-flexible substrate, terminated at the edge of the wider end of the metallized patch and the unmetallized opening.

4. A wideband circularly polarized antenna comprising:
a ground plane substrate with at least two metal layers, with the upper metal layer continuously metallised to comprise a ground plane surface, and with a first central mounting slot and a second central mounting slot disposed co-centric with and orthogonal to said first central mounting slot, and a plurality of peripheral mounting slots,
a first and a second dipole substrate of equal outer dimensions, equally patterned with a balun and a narrowband dipole imprinted in metal layers on the dipole substrate, said balun connected to metallized terminals on projecting tabs at the center of the lower edge of said dipole substrates, said first and second dipoles including interlocking slots to provide for assembly of a 3 dimensional crossed dipole structure,
an assembly comprised of an orthogonal dipole structure mounted on said ground plane substrate by insertion of the respective ones of said projecting tabs into said first and second central mounting slots, and four interstitial support substrates mounted orthogonal to the ground plane, each rotated 45 degrees relative to an arbitrary one of said crossed dipole axes, so as to be similarly disposed in each quadrant of said crossed dipole structure, each interstitial support substrate having an upper profile identical to said crossed dipoles,
with first and second balun feeds connected a first and a second output of feed circuit comprised of an RF 90 degree coupler
a first, a second, a third and a fourth opposed petal pairs each comprised of a first petal and a distal second petal etched in metal with a non-conductive margin, on a semi-flexible substrate each of identical dimensions, each petal with a wider end and a distal narrower end, with a central axis longer than the wider end, with progressively decreasing width between said wider end and said narrower end, said first and second petals co-linear, with the proximate ends of said first and second petals being the narrower ends, the axis of an arbitrary second petal pair is rotated by 45 degrees relative to the axis of said first petal pair, with equal rotation between said third and said second petal pairs and said fourth and said third petal pairs, each with a common mid-point between first and second petals on each extended axis of each petal pair defined as the geometric antenna center, each of said metallized petals having a plurality of metallized attachment tabs at the wider end, electrically isolated from said metallized petals, said semi-flexible substrate of sufficient length to form a domed structure by insertion of said attachment tabs into said peripheral mounting slots in said ground plane with at least one of said petal pairs aligned along the axes of the one of said crossed dipoles, the upper edge of said first and second dipole substrates sculpted identically to provide a precise space between the opposed petal pairs associated with each of said crossed narrowband dipoles, the upper edges of said interstitial support substrates further sculpted identically to said dipole substrates whereby said dipoles are effective through electromagnetic coupling to comprise a wideband distributed feed network for a circularly polarized antenna, wherein none of said opposed petal pairs is directly connected.

5. The wideband circularly polarized antenna of claim 4, wherein said plurality of metallized attachment tabs associated with a single one of each of said metallized petals are electrically connected by thin conducting metallized links, each immediately adjacent to the attachment tabs, and parallel with the wider edge of the metallized petal;

said metallized links being electrically isolated from each of said metallized petals by means of a narrow, unmetallized opening between the metallized link and the metallized petal; and the metallized link is electrical connected to ground and presents a predetermined capacitance to its associated metallized petal.

6. The wideband circularly polarized antenna of claim 5, wherein each petal of said first and said second opposed petal pairs has a plurality of unmetallized slots etched into the petal metallization, parallel to the petal axis, of a pre-determined number, length and width, on the continuous semi-flexible substrate, terminated at the edge of the wider end of the metallized patch and the unmetallized opening.

7. A method of providing a wideband circularly polarized antenna, the method comprising providing a ground plane substrate (120) with at least two metal layers, with the upper metal layer continuously metallized to comprise a ground plane surface, and with a first central mounting slot and a second central mounting slot disposed co-centric with and orthogonal to said first central mounting slot, and a plurality of peripheral mounting slots;

providing a first dipole substrate (220) and a second dipole substrate (230) of equal outer dimensions, equally patterned with a balun and a narrowband dipole imprinted in metal layers on the dipole substrate, said balun connected to metallized terminals on projecting tabs (130) at the center of the lower edge of said dipole substrates, said first dipole substrate (220) and a second dipole substrate (230) including interlocking slots to provide for assembly of a three-dimensional orthogonal crossed dipole structure;

forming an assembly by forming the three-dimensional orthogonal crossed dipole structure comprising the first dipole substrate (220) and second dipole substrate (230) mounted on the ground plane substrate (120) by insertion of the respective ones of the projecting tabs (130) into said first and second central mounting slots where the projecting tabs when assembled into said first and second central mounting slots are electrically connected to first and second balun feeds which connect with a first output and a second output of a feed circuit comprising an RF 90 degree coupler; wherein the wideband circularly polarized antenna has one of a first configuration and a second configuration;

the wideband circularly polarized antenna further comprises a first opposed petal pair and a second opposed petal pair where each is comprised of a first petal (110) and a distal second petal (110) etched in metal with a non-conductive margin, on a semi-flexible substrate each of identical dimensions, each petal (110) with a wider end and a distal narrower end, with a central axis longer than the wider end, with progressively decreasing width between said wider end and said narrower end, said first and second petals (110) co-linear, with the proximate ends of said first and second petals (110) being the narrower ends, said first and second opposed petal pairs disposed with the axis of each orthogonal to the other, with the common mid-point between first and second petals (110) on each extended axis defined as the geometric antenna center;

each of said metallized petals (110) having a plurality of metallized attachment tabs (1010) at the wider end, electrically isolated from said metallized petals, said semi-flexible substrate of sufficient length to form a domed structure by insertion of said attachment tabs (1010) into said peripheral mounting slots in said ground plane with said petal pairs aligned along the axes of the crossed dipoles; and the upper edge of said first and second dipole substrates (220, 230) is sculpted identically to provide a precise space between the opposed petal pairs and said crossed narrowband dipoles whereby said dipoles are effective through electromagnetic coupling to comprise a wideband distributed feed network for a circularly polarized antenna, wherein none of said opposed petal pairs is directly connected.

8. The method according to claim 7, wherein said plurality of metallized attachment tabs (1010) associated with a single one of each of said metallized petals is electrically connected by thin conducting metallized links (1320), each immediately adjacent to the attachment tabs, and parallel with the wider edge of the metallized petal;

said metallized links (1320) being electrically isolated from said metallized petals by means of a narrow, unmetallized opening between the metallized link (1320) and the metallized petal; and the metallized link (1320) is electrical connected to ground and presents a predetermined capacitance to its associated metallized petal.

9. The method according of claim 7, wherein each petal of said first and said second opposed petal pairs has a plurality of unmetallized slots etched into the petal metallization, parallel to the petal axis, of a pre-determined number, length and width, on the continuous semi-flexible substrate, terminated at the edge of the wider end of the metallized patch and the unmetallized opening.

10. The method according to claim 7, wherein providing a metallic element disposed between the second distal ends of each petal of the first opposed pair of metallized petals and the second distal ends of petal of the second opposed pair of metallized petals; wherein the metallic element is capacitively coupled to the centre ends of the plurality of petal pairs; and a linear dimension of the metallic element is determined in dependence upon a tuning to be applied to the first opposed pair of metallized petals and the second opposed pair of metallized petals.

11. The method according to claim 7, wherein local current maxima in each of the antenna metallized petals are offset from the dipole center; and an inflexion in the magnitude of a current in the combined radiating elements comprising the narrow band dipole and symmetrical arrangement of metallized petals occurs at the center of the dipole.

12. A method of providing a wideband circularly polarized antenna, the method comprising providing a ground plane substrate (120) with at least two metal layers, with the upper metal layer continuously metallized to comprise a ground plane surface, and with a first central mounting slot and a second central mounting slot disposed co-centric with and orthogonal to said first central mounting slot, and a plurality of peripheral mounting slots;

providing a first dipole substrate (220) and a second dipole substrate (230) of equal outer dimensions, equally patterned with a balun and a narrowband dipole imprinted in metal layers on the dipole substrate, said balun connected to metallized terminals on projecting tabs (130) at the center of the lower edge of said dipole substrates, said first dipole substrate (220) and a second dipole substrate (230) including interlocking slots to provide for assembly of a three-dimensional orthogonal crossed dipole structure;

forming an assembly by forming the three-dimensional orthogonal crossed dipole structure comprising the first dipole substrate (220) and second dipole substrate (230) mounted on the ground plane substrate (120) by insertion of the respective ones of the projecting tabs (130) into said first and second central mounting slots where the projecting tabs when assembled into said first and second central mounting slots are electrically connected to first and second balun feeds which connect with a first output and a second output of a feed circuit comprising an RF 90 degree coupler; wherein the wideband circularly polarized antenna has one of a first configuration and a second configuration;

the wideband circularly polarized antenna further comprises four interstitial support substrates (210A, 210B, 21C, 210D) mounted orthogonal to the ground plane, each rotated 45 degrees relative to an arbitrary one of said crossed dipole axes, so as to be similarly disposed in each quadrant of said crossed dipole structure, each interstitial support substrate having an upper profile identical to said crossed dipoles;

a first opposed petal pair, a second opposed petal pair, a third opposed petal pair and a fourth opposed petal pair where each is comprised of a first petal (110) and a distal second petal (110) etched in metal with a non-conductive margin, on a semi-flexible substrate each of identical dimensions, each petal (110) with a wider end and a distal narrower end, with a central axis longer than the wider end, with progressively decreasing width between said wider end and said narrower end, said first and second petals (110) co-linear, with the proximate ends of said first and second petals being the narrower ends;

the axis of an arbitrary second petal pair is rotated by 45 degrees relative to the axis of said first petal pair, with equal rotation between said third and said second petal pairs and said fourth and said third petal pairs, each with a common mid-point between first and second petals (110) on each extended axis of each petal pair defined as the geometric antenna center;

each of said metallized petals having a plurality of metallized attachment tabs (1010) at the wider end, electrically isolated from said metallized petals, said semi-flexible substrate of sufficient length to form a domed structure by insertion of said attachment tabs (1010) into said peripheral mounting slots in said ground plane with at least one of said petal pairs aligned along the axes of the one of said crossed dipoles; and the upper edge of said first and second dipole substrates (220, 230) sculpted identically to provide a precise space between the opposed petal pairs associated with each of said crossed narrowband dipoles, the upper edges of said interstitial support substrates (210A, 210B, 21C, 210D) further sculpted identically to said dipole substrates whereby said dipoles are effective through electromagnetic coupling to comprise a wideband distributed feed network for a circularly polarized antenna, wherein none of said opposed petal pairs is directly connected.

13. The method according to claim 12, wherein said plurality of metallized attachment tabs (1010) associated with a single one of each of said metallized petals is electrically connected by thin conducting metallized links (1320), each immediately adjacent to the attachment tabs, and parallel with the wider edge of the metallized petal;

said metallized links (1320) being electrically isolated from said metallized petals by means of a narrow, unmetallized opening between the metallized link (1320) and the metallized petal; and the metallized link (1320) is electrical connected to ground and presents a predetermined capacitance to its associated metallized petal.

14. The method according of claim 12, wherein each petal of said first opposed petal pair, the second opposed petal pair, the third opposed petal pair and the fourth opposed petal pair has a plurality of unmetallized slots etched into the petal metallization, parallel to the petal axis, of a pre-determined number, length and width, on the continuous semi-flexible substrate, terminated at the edge of the wider end of the metallized patch and the unmetallized opening.

15. The method according to claim 12, wherein providing a metallic element disposed between the second distal ends of each petal of the first opposed pair of metallized petals, the second distal ends of petal of the second opposed pair of metallized petals; the second distal ends of petal of the third opposed pair of metallized petals and the second distal ends of petal of the fourth opposed pair of metallized petals; wherein metallic element is capacitively coupled to the centre ends of each of the first opposed petal pair, the second opposed petal pair, the third opposed petal pair and the fourth opposed petal pair; and a linear dimension of the metallic element is determined in dependence upon a tuning to be applied to the first opposed petal pair, the second opposed petal pair, the third opposed petal pair and the fourth opposed petal pair.

16. The method according to claim 12, wherein local current maxima in each of the antenna metallized petals are offset from the dipole center; and an inflexion in the magnitude of a current in the combined radiating elements comprising the narrow band dipole and symmetrical arrangement of metallized petals occurs at the center of the dipole.

\* \* \* \* \*